United States Patent
Jin

(10) Patent No.: US 10,455,598 B2
(45) Date of Patent: Oct. 22, 2019

(54) SCHEDULING ALGORITHM AND METHOD FOR TIME SLOTTED CHANNEL HOPPING (TSCH) MAC

(71) Applicant: KABUSHIKI KAISHA TOSHIBA, Minato-ku (JP)

(72) Inventor: Yichao Jin, Bristol (GB)

(73) Assignee: KABUSHIKI KAISHA TOSHIBA, Minato-ku (JP)

(\*) Notice: Subject to any disclaimer, the term of this patent is extended or adjusted under 35 U.S.C. 154(b) by 0 days.

(21) Appl. No.: 15/546,797

(22) PCT Filed: Sep. 2, 2015

(86) PCT No.: PCT/GB2015/052538
§ 371 (c)(1),
(2) Date: Jul. 27, 2017

(87) PCT Pub. No.: WO2017/037403
PCT Pub. Date: Mar. 9, 2017

(65) Prior Publication Data
US 2018/0035442 A1    Feb. 1, 2018

(51) Int. Cl.
*H04W 72/12* (2009.01)
*H04W 24/04* (2009.01)
(Continued)

(52) U.S. Cl.
CPC ........... *H04W 72/12* (2013.01); *H04L 1/1887* (2013.01); *H04L 5/0064* (2013.01); *H04W 24/04* (2013.01);
(Continued)

(58) Field of Classification Search
CPC . H04L 1/1887; H04L 5/00; H04L 1/18; H04L 5/0005; H04L 5/0064; H04W 24/04;
(Continued)

(56) References Cited

U.S. PATENT DOCUMENTS

| | | | |
|---|---|---|---|
| 7,420,950 B2 * | 9/2008 | Barak | H04B 7/265 370/337 |
| 8,248,989 B2 * | 8/2012 | Jeong | H04B 7/2656 370/321 |

(Continued)

FOREIGN PATENT DOCUMENTS

| | | |
|---|---|---|
| JP | 2002-84213 | 3/2002 |
| JP | 2015-518686 | 7/2015 |
| WO | WO 2011/089135 A1 | 7/2011 |

OTHER PUBLICATIONS

International Search Report and Written Opinion dated Aug. 16, 2016 in PCT/GB2015/052538 filed Sep. 2, 2015.

(Continued)

*Primary Examiner* — Tri H Phan
(74) *Attorney, Agent, or Firm* — Oblon, McClelland, Maier & Neustadt, L.L.P.

(57) ABSTRACT

A network device for a wireless local area network, specifically a TSCH MAC and IEEE 802.15.4e wireless network. The network device can wirelessly communicate with a plurality of wireless network nodes over at least one frequency channel according to a schedule which allocates cells to links. A cell is a timeslot on a frequency channel; and a link represents communication between two network nodes or a network node and the network device. The network device has a radio and a processor. The radio is operable to receive traffic information, comprising the number of packets each of the network nodes is planning to transmit during a scheduling period and the processor is configured to define a schedule. The schedule has at least one cell allocated to a link as a redundancy cell for communicating a packet when communication of a packet by the link during an earlier allocated cell fails.

14 Claims, 14 Drawing Sheets

(51) Int. Cl.
*H04W 72/04* (2009.01)
*H04L 1/18* (2006.01)
*H04L 5/00* (2006.01)
*H04W 84/12* (2009.01)

(52) U.S. Cl.
CPC ......... *H04W 72/044* (2013.01); *H04L 5/0005* (2013.01); *H04W 72/1226* (2013.01); *H04W 84/12* (2013.01)

(58) Field of Classification Search
CPC ... H04W 72/04; H04W 72/044; H04W 72/12; H04W 72/1226; H04W 84/12; H04W 16/10; H04W 40/02; H04W 72/02; H04W 84/18; H04J 3/00; H04J 3/16; H04J 14/08; H04B 7/26; H04B 7/212
See application file for complete search history.

(56) References Cited

U.S. PATENT DOCUMENTS

| | | | | |
|---|---|---|---|---|
| 9,485,157 | B2* | 11/2016 | Thubert | H04L 43/06 |
| 9,510,347 | B2* | 11/2016 | Thubert | H04W 40/22 |
| 9,590,692 | B2* | 3/2017 | Thubert | H04B 1/707 |
| 9,800,506 | B2* | 10/2017 | Vasseur | H04L 47/127 |
| 9,854,516 | B2* | 12/2017 | Kandhalu Raghu | H04W 52/0209 |
| 10,038,608 | B2* | 7/2018 | Thubert | H04L 43/062 |
| 10,187,285 | B2* | 1/2019 | Kandhalu Raghu | H04L 43/16 |
| 10,231,163 | B2* | 3/2019 | Chen | H04W 40/02 |
| 2001/0053142 | A1* | 12/2001 | Abe | H04L 1/0041 370/337 |
| 2005/0226198 | A1 | 10/2005 | Barak et al. | |
| 2013/0028103 | A1 | 1/2013 | Hui et al. | |
| 2013/0250928 | A1 | 9/2013 | Choi et al. | |
| 2014/0036751 | A1 | 2/2014 | Xhafa et al. | |
| 2014/0233375 | A1 | 8/2014 | Thubert et al. | |
| 2016/0105774 | A1* | 4/2016 | Doi | H04W 4/06 370/312 |

OTHER PUBLICATIONS

Xavier Vilajosana, et al., "A Realistic Energy Consumption Model for TSCH Networks", IEEE Sensors Journal, vol. 14, No. 2, Feb. 2014, XP011533049, pp. 482-489.

IEEE Standard for local and Metropolitan Area Networks, Part 15.4: Low Rate Wireless Personal Area Networks (LR-WPANs) Amendment to the MAC sub-Layer, vol. 802.15.4e, XP017646911, Oct. 14, 2011, 1-233.

Kai-Wen Cheng, et al., Dynamic Pre-allocation HARQ (DP-HARQ) in IEEE 802.16j Mobile Multihop Relay (MMR), Communications, ICC '09. IEEE, Jun. 14, 2009, XP031505932, pp. 1-6.

Thubert, P. "IPv6 over the TSCH mode of IEEE 802.15.4e (6tisch)", https://datatracker.ietf.org/wg/6tish/charter/, 2015, 42 pages.

Dujovne, D. et al. "6TiSCH: Deterministic IP-Enabled Industrial Internet (of Things)" IEEE Communications Magazine, vol. 52, No. 12, 2014, 6 pages.

Ergen, 8.0. et al. "PEDAMACS: Power Efficient and Delay Aware Medium Access Protocol for Sensor Networks" IEEE Transactions on Mobile Computing, vol. 5, No. 7, 2006, 11 pages.

Tinka, A. et al. "A Decentralized Scheduling Algorithm for Time Synchronized Channel Hopping" ICST Transactions on Mobile Communications and Computing, 2011, 13 pages.

Palattella, M.R. et al. "Traffic Aware Scheduling Algorithm for Reliable Low-Power Multi-Hop IEEE 802.15.4e Networks" IEEE 23rd International Symposium on Personal, Indoor and Mobile Radio Communications—(PIMRC), 2012, 6 pages.

* cited by examiner

☐ *Primary schedule*
☐ Redundancy cells
▨ Empty cells that are still available

| Traffic | 1 | 2 | 3 | 4 | 5 | 6 | 7 | 8 |
|---|---|---|---|---|---|---|---|---|
| AMUS | 100 | 100 | 100 | 100 | 100 | 100 | 100 | 100 |
| AMUS (CAP) | 19 | 36 | 60 | 79 | 90 | 100 | 100 | 100 |

SCHEDULING ALGORITHM AND METHOD FOR TIME SLOTTED CHANNEL HOPPING (TSCH) MAC

FIELD

Embodiments described herein relate generally to scheduling systems for wireless networks, more specifically, scheduling systems for Time Slotted Channel Hopping Medium Access Control (TSCH MAC) and IEEE 802.15.4e networks.

BACKGROUND

In a wireless network, TSCH technology divides the wireless bandwidth into time and frequency and wireless nodes can communicate (i.e. transmit and/or receive data) during a timeslot over a specific bandwidth (i.e. frequency channel). A Time Division Multiple Access (TDMA) schedule determines during which timeslot and over which frequency channel a node should transmit or receive data to/from its neighbours.

In the latest defined IEEE 802.15.4e standard, the mechanism of how the TSCH schedule operates in the network is defined, but it is not specified how an optimised schedule is built. It is desirable to have a scheduling method that is compliant to TSCH and work based on the IEEE 802.15.4e TSCH MAC.

Industrial applications can have different latency demands. For example, process control or monitoring applications (e.g. environmental monitoring) can be non-time critical. On the other hand, factory automation, disaster defence and safety applications etc. highly sensitive to delays. Thus, the latency and system response time of such applications is important and the Quality of Service (QoS) requirements are often in the scale of hundreds of milliseconds.

Many wireless networks have links between nodes of poor quality, resulting in a high rate of communication failure between these nodes. Furthermore, certain links between nodes may have a higher traffic demand (i.e. are required to transmit more data packets during a scheduling period). It may be advantageous for a scheduling method to account for these variations in link reliability and traffic demand when defining a schedule.

Wireless network nodes are often powered by batteries with limited capacity. As such, power efficiency should be maximised and unnecessary power usage within devices should be minimised.

DETAILED DESCRIPTION

Figure 1:
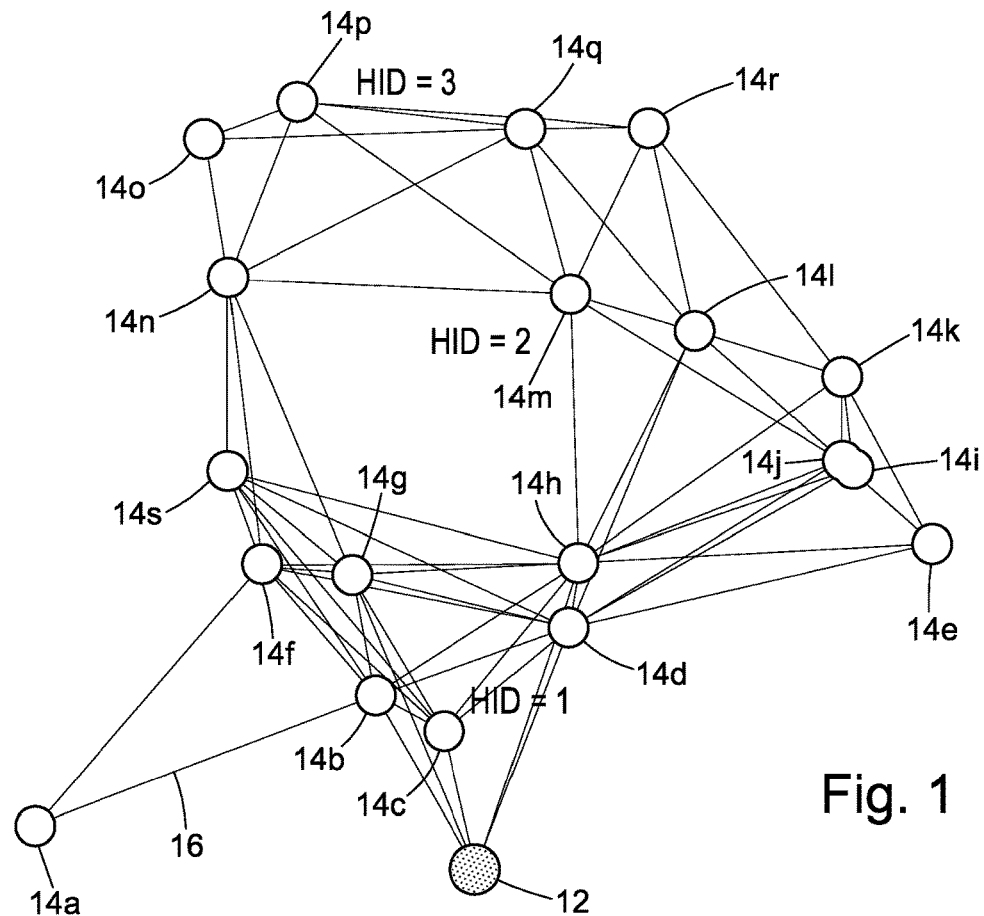
FIG. 1 schematically illustrates a wireless network.

According to an embodiment is a network device for a wireless local area network, wherein the network device is operable to wirelessly communicate with a plurality of wireless network nodes over at least one frequency channel according to a schedule which allocates cells to links; wherein a cell is a timeslot on a frequency channel; and a link represents communication between two network nodes or a network node and the network device; the network device comprising: a radio operable to receive traffic information comprising the number of packets each of the network nodes is planning to transmit during a scheduling period; and a processor configured to define a schedule; wherein the schedule comprises at least one cell allocated to a link as a redundancy cell for communicating a packet when communication of a packet by the link during an earlier allocated cell fails.

The network device may be configured to use, be compatible with or be in accordance with, the Internet Engineering Task Force (IETF) 6TiSCH for IEEE 802.15.4e standard.

The network device may be for use in any wireless network. Such a wireless network may comprise a network device and a plurality of network nodes. The network device may be or comprise a hub. The network device may be identical to a network node. The network device may, therefore, be configured to execute any method described herein in relation to a network node. The network device may be a Path Computation Element (PCE). The network device may be a network station. The network device may be a network node designated as the personal area network (PAN) coordinator.

The network device may comprise a processor and storage device. The processor may be configured to execute instructions stored on the storage device, the instructions configured to, when executed by the processor, define a schedule. The schedule may comprise at least one cell allocated to a link as a redundancy cell for communicating a packet when communication of a packet by the link during an earlier allocated cell fails.

Any network device according to an embodiment may comprise a processor and a storage device. The processor may be configured to execute instructions stored on the storage device. The instructions may be method steps as described in relation to any method according to an embodiment, or any method steps for which a processor, or network device, is described herein as being configured to undertake.

The network device and network nodes of the wireless network may be operable to communicate over a plurality of frequency channels. The number of frequency channels over which the network device and network nodes are operable to communicate may be defined in technical standards.

A link is a pairing of two network nodes or a network node and the network device. A link represents a single direct communication. When a packet is communicated over a link, one of the network nodes (or the network device) will be the transmitter, or sender, and the other will be the receiver. The sending node will transmit the data packet to the receiver and, if it's successfully received, the receiver will send an acknowledgement to the sender. A communication over a link represents a single hop. Some network nodes may not be directly connected to the network device by a single link. As such, their data packets may need to be relayed by other nodes in order to reach the network device. The minimum number of links which need to be used to transmit a data packet derived from a node to the network device is the hop distance ID (HID) of the respective node.

A scheduling period is a period of time for which a schedule is to be defined, which will repeat overtime. A scheduling period may be referred to as a superframe. A scheduling period may be divided into a plurality of timeslots. A scheduling period may be a standard unit of time determined by the network device, wherein a schedule defined for the scheduling period is repetitively executed over the scheduling period.

A cell is defined as a specific timeslot on a specific frequency channel. As such, a scheduling period comprises a total number of cells equal to the number of timeslots in the scheduling period multiplied by the number of frequency channels over which the network device and network nodes are operable to communicate.

The network device may comprise a radio which may be operable to transmit and receive data to/from a network node. The radio may be operable to transmit a schedule to a, or each, network node. The radio may be operable to periodically receive an Expected Receptions value from a, or each, node. The radio may comprise an antenna.

The network device may be configured to transmit a schedule or schedule information to a network node using a Contrained Application Protocol or other light weight application layer protocol.

The processor may be configured to execute instructions which may be stored on a storage device to define a schedule. The processor may be further configured to send the schedule via the radio to a network node. The processor may be configured to transmit a schedule, via the radio, to a, or each node. The processor may be configured to transmit a command, via the radio to a, or each, node to implement the schedule.

The processor may be configured to transmit a command, via the radio to a, or each, node. The command may be configured to instruct a node to communicate a packet during at a cell (i.e. at a specific time over a specific frequency channel). Communicating a packet may comprise listening to receive a packet or transmitting (sending) a packet. The command may be configured to instruct the node to communicate a packet during a cell allocated as part of a primary schedule, or during a redundancy cell.

When the command is configured to instruct the node to communicate a packet at a redundancy cell, the node may only communicate a packet if it is expecting to transmit or receive a packet during the relevant cell.

The radio may be operable to receive traffic information using a contentious wireless network method. The radio may be operable to receive traffic information using a light weight application layer protocol such as Constrained Application Protocol. A constant bit rate may be assumed for a network node. The traffic information may be received only once during a period of operation. The traffic information may only be received upon initialisation of the network device or network. The traffic information may also be received whenever the traffic information of a network node changes.

The traffic information may comprise the number of packets each of the network nodes plans to transmit during a scheduling period. A packet is a data packet and is traffic on the network. The number of packets each of the network nodes plans to transmit during a scheduling period may be a proposal made by each node. The number of packets each of the network nodes plans to transmit during a scheduling period may comprise, or be equal to, the number of data packets generated by a network node during a scheduling period. In some embodiments, the number of data packets a node is planning to transmit may comprise a number of packets which were not transmitted during an earlier scheduling period.

Where a cell is for communicating a packet, it is to be read as the cell being suitable for a packet being communicated by the respective link at the timeslot and on the frequency channel of the cell for communicating a packet. Likewise, when a packet is to be communicated at a cell, in a cell, during a cell or on a cell, it means that a packet is communicated during the respective timeslot and at the respective frequency of the cell.

In a known method, if transmission of a data packet during an allocated timeslot fails due to poor link condition etc., MAC retransmission will occur and cells scheduled for other packets could be taken up by the retransmission. If there is no other scheduled cell available for the link on which the transmission failed, re-transmission has to take place in the next superframe. This can result in significant delays, increased latency and reduced throughput.

In an embodiment, cells are allocated to links as redundancy cells. Data packets that have not been successfully transmitted during a first cell allotted to that link for the that data packet may be transmitted during/using redundancy cells without taking up a cell with retransmission that was previously allocated to transmit another packet. This prevents data packets which have not been transmitted in a first superframe from being carried over to a second superframe.

A redundancy cell may be configured such that a packet may be communicated when communication of the, or a further, packet, by the link to which the cell is allocated, fails during an earlier allocated cell.

A redundancy cell may be a cell that is allocated to a link but is not allocated for a specific packet. A redundancy cell may be configured such that using a redundancy cell to transmit or retransmit a first data packet does not replace the transmission of a second data packet. A redundancy cell may be for transmitting any data packet over a specific link.

Using a redundancy cell for a transmission or retransmission of a first packet will not affect, change or cancel the transmission or retransmission of a second data packet.

A redundancy cell may be configured such that the respective link only communicates during the redundancy cell after checking that a packet is to be communicated.

In alternative embodiments, a redundancy cell may be for communicating a packet when communication of a packet by a further link during an earlier allocated cell fails.

In some embodiments according to the disclosure a cell is allocated to a link as a redundancy cell based on the properties of that link. The cell is not allocated as a redundancy cell to be part of a redundancy transmission route whereby an entire secondary route is allocated cells. As such, a redundancy cell is configured such that it can communicate any packet for which transmission by the respective link has failed, the redundancy cell is not allocated in order to communicate a specific packet or a packet from a specific source node in the event that failure occurs.

The number of redundancy cells allocated to a link may be dependent on the number of packets communicated during a scheduling period by the link. The number of packets communicated during a scheduling period may be equal to, or comprise, the number of packets which are predicted as being communicated during a scheduling period.

The number of redundancy cells allocated to a link may be determined by the number of packets communicated during a scheduling period by the link. The number of redundancy cells allocated to a link may be determined by the number of packets the network node plans to transmit during a scheduling period by the sender node of the respective link. The number of redundancy cells allocated to a link may be determined by the number of packets generated during a scheduling period by the sender node of the respective link. The number of redundancy cells may be directly proportional to the number of packets communicated during a scheduling period by the link.

The routing path of a network node of the respective link or of a further link may be determined in order to determine the number of packets communicated by a link during a scheduling period. A routing path for a respective node may comprise a link or series of links for transferring data from the respective node to the network device. A routing path of all of the network nodes may be determined in order to determine the number of packets communicated by a link during a scheduling period. The number of packets communicated during a scheduling period can be determined because the number of packets generated, or planned to be transmitted, by each node is known as part of the network topology and traffic information, and the routing path of the network nodes determines which links will communicate excess traffic by acting as relay links.

The number of redundancy cells allocated to a link may be dependent on a weighting value. The weighting value may be dependent on at least one of the total number of timeslots in the scheduling period and traffic information for the link's nodes or node and the network device.

A plurality of weighting values may be calculated for a respective link. A weighting value may be calculated for the sending node and/or the receiving node of the respective link. The number of redundancy cells may be dependent on the minimum or maximum value of a plurality of weighting values.

The number of redundancy cells and/or a weighting value may be dependent on one or a plurality of the following:
the total number of timeslots in a scheduling period;
the amount of traffic transmitted by one or both of the nodes of the respective link;
the amount of traffic received by one or both of the nodes of the respective link;
and
the number of redundancy cells allocated to a corresponding link of a previous hop (i.e. a neighbouring link with a lower hop-distance ID over which a packet from the link of interest may travel on its way to the network device).

The number of redundancy cells Tc that are assigned to a link, $l_j^i$, between a sending network node, i, and a receiving network node, j, may be determined by:

$$Tc(l_j^i) = \lfloor R(l_j^i) \times \min(w_{N_i}, w_{N_j}) \rfloor$$

where $R(l_j^i)$ is a data rate of packets per scheduling period for link $l_j^i$; and:

$$w_{N_i} = \frac{T_{total} - (R_{tx}(l^{N_i}) + R_{rx}(l_{N_i}) + Tc(l^{N_i}))}{R_{tx}(l^{N_i})}$$

$$w_{N_j} = \frac{T_{total} - (R_{tx}(l^{N_j}) + R_{rx}(l_{N_j}) + Tc(l^{N_j}))}{R_{rx}(l^{N_i})}$$

where $T_{total}$ is the total number of cells in a scheduling period; $R_{tx}(\ )$ and $R_{rx}(\ )$ are the transmitted and received packets during a scheduling period respectively, for a link l involving node $N_v$ as the transmitting or receiving network node; and $Tc(l^{N_v})$ is the number of redundancy cells that are already assigned to a link with $N_v$ as the sender. This may be a previous link in the routing path.

A previous link in the routing path may be a link with a smaller HID number (i.e. closer to the network device) or a link which has already had a redundancy cell allocated to it.

A routing path may be defined for a node of the link of interest, or both nodes of the link of interest, or a further node. Such a routing path may be determined as described anywhere herein.

The processor may be further configured to check for a scheduled cell whether the network device is expecting to receive a packet, wherein a scheduled cell is a cell allocated in the schedule to a link. In this case, the link may be a link associated with the network device. The network device may be configured to check, for a scheduled cell, whether the network device is expecting to receive a packet over the link to which the cell is allocated.

The processor may be configured to only power up the radio for a timeslot when a packet is expected over the link to which the cell was allocated. The processor may be configured to only "wake up" the network device when a packet is expected over the link to which the cell was allocated. When a packet is not expected, the network device may be in a low power mode to conserve energy.

In order to minimise power consumption, rather than listening for a packet whenever the network device has a scheduled cell, the network device may only listen in order to receive a packet when the network device is expecting to receive a packet. As such, before each cell scheduled to a link for which the network device is acting as a receiver, the network device may check whether a packet is expected over the respective link. If no packet is expected, the network device will not listen during the scheduled cell. Effectively, the network device may ignore a scheduled cell if it is not expecting to receive a packet.

Checking whether the network device is expecting to receive a packet may comprise checking a receiving queue. A receiving queue, B(i), may be defined as:

$$B(i)=B(i-1)+Er$$

where B(i-1) is the number of packets which have been carried over from a previous scheduling period for the network device and Er is the number of packets which are expected to be received by the network node during a scheduling period. This definition may be an initial definition for the start of a scheduling period. The processor may be configured to update the receiving queue every time a packet is received by the network device. A packet may be expected when B(i)>0.

The packets which have been carried over from a previous scheduling period are packets which were not communicated during a previous scheduling period.

The expected receptions Er may be acquired or calculated by the network device. Er may be periodically updated by collecting the runtime queue size of the nodes, wherein the nodes transmit information regarding their runtime queue size to the network device and the network device collates the information and sends information regarding the Er of each node to the respective nodes. As such, a node may periodically receive an updated Er from the network device.

Checking whether the network device is expecting to receive a packet may comprise checking whether an end of queue transmission has been received from a network node. Checking whether the network device is expected to receive a packet from a first node may comprise checking whether an end of queue transmission has been received from the first node. Checking whether the network device is expecting to receive a packet may comprise checking whether an end of queue transmission has been received from all of the network nodes that can transmit to the network device. A packet may be expected to be received when an end of queue transmission has not been received from a neighbouring node which can transmit to the network node.

An end of queue transmission may be a separate data packet or an addition to an existing data packet that notifies the receiver (whether that's the network device or a node) that the sender node has no further data packets to be sent to the receiver.

An end of queue transmission may only be sent by a first node when an end of queue transmission has been received by the first node from all of the nodes that can transmit to the first node.

If an end of queue transmission has been received from a network node, it is known that the receiver for the corresponding link does not need to wake up for cells allocated to that link in the current scheduling period. As such, checking whether the network device is expecting to receive any further packet in the present scheduling period may comprise checking whether an end of queue transmission has been received from all of the network nodes that can transmit to the network device in the active scheduling period.

In such an embodiment, the network device may check whether such instructions have been received from a node, or from all of the nodes operable to transmit directly to the network device and, if so, then assume that no further packets are to be received in the present scheduling period, so the network device no longer needs to listen during allocated cells in the present scheduling period.

The network device may be configured such that it only activates/listens for a packet when an end of queue transmission has not been received in the present scheduling period from at least one of the nodes operable to directly transmit to the network device.

The radio may be operable to receive network topology. The schedule may further comprise a primary schedule for communicating all of the packets the network nodes plan to transmit during a scheduling period if no communication fails. Defining the primary schedule may comprise: defining a network node sequence; determining a routing path for each network node; wherein a routing path for a respective node comprises a link or series of links for transferring data from the respective node to the network device; determining the number of packets to be communicated by each link of each respective routing path; and allocating each link of each respective routing path a cell for each packet; wherein the order in which the links are allocated cells is determined by the network node sequence and corresponding routing paths.

The schedule may comprise a primary schedule. A primary schedule may be a schedule which—given perfect communication of all packets (i.e. no errors, collisions or interference)—is sufficient to transmit all of the required data packets from the respective network nodes to the network device.

The processor may be configured to define a primary schedule. In order to define a primary schedule, the processor may require network topology information. This information may comprise the HID of network nodes and the one-hop communication interference range. The network topology information may be acquired by the network device by using contention based methods.

The network node sequence influences the order in which links are allocated cells in the primary schedule. The network node sequence may be determined using, for example, optimisation algorithms, genetic algorithms or stochastic approaches to provide an optimised network node sequence. A simple, low complexity greedy algorithm (i.e. an algorithm that follows the problem solving heuristic of making the locally optimal choice at each stage with the hope of finding a global optimum) may be used, this minimises the scheduling time.

For each network node in the network node sequence, a routing path is determined and defined. The routing path is a link or a series of links that connect the respective node to the network device (i.e. a series of nodes through which a data packet can be transmitted to reach the network device). A routing path may be determined by an optimisation algorithm, for example to optimise, or according to, one of the following: shortest path based, load balancing based or link quality based (RPL). A routing path may represent the minimum number of hops to reach the network device.

Determining the number of packets that need to be communicated by each link may be done using the traffic information acquired by the network device and the routing paths. Once a routing path has been determined for every node and the amount of traffic every node plans to transmit during a scheduling period is known, the amount of traffic each link of each routing path has to transmit can be derived.

Cells can be allocated to each link to define a primary schedule. The order in which links are allocated cells is determined by the network node sequence and routing path. The network node sequence may be expanded, wherein each network node is replaced by its respective routing path, arranged in a sequential order from the respective network node to the network device. Cells may then be allocated to links in the order defined by the network node and corresponding routing paths. For example, if a first network node only plans to transmit a single packet during a scheduling period and its corresponding routing path has two links (two hops) to go from the first network node to the network device via a second network node; a cell is first allocated to the link from the first network node to the second network node and a cell is then allocated to the link from the second network node to the network device.

A cell is allocated for each data packet, of each link, of each routing path according to the order of the network node sequence expanded to include the routing paths. As such, in the above example: if a first network node plans to transmit two packets during a scheduling period and its corresponding routing path has two links (two hops) to go from the first network node to the network device via a second network node; a cell is first selected and allocated to the link from the first network node to the second network node for the one of the data packets; next, a further cell is selected and allocated to the link from the first network node to the second network node for the other data packet; a cell is then allocated to the link from the second network node to the network device for one of the data packets before a second cell is selected and allocated to the link from the second network node to the network device for the other data packet.

Defining the schedule may further comprise: selecting a cell for allocating to a respective link. Selecting a cell for a respective link may comprise checking, for a first timeslot, whether the two nodes or the node and the network device associated with the respective link have already been allocated a cell during that timeslot, when one of the two nodes or one of the node and the network device has already been allocated a cell in the first timeslot: checking, for a further timeslot, whether the two nodes or the node and the network device associated with the respective link have already been allocated a cell during that timeslot; or when neither of the two nodes or the node and the network device have been allocated a cell in the first timeslot: checking, for a first frequency channel in the first timeslot, whether any node or the network device, capable of interfering with the respective link on the first frequency channel has already been allocated a cell; and when an interfering node or network device has been allocated a cell in the first timeslot: checking, for a further frequency channel, whether any node or the network device capable of interfering with the respective link on the first frequency channel has already been allocated a slot; or when no interfering node or network device has been allocated a cell in the first timeslot: allocating the first cell on the first frequency channel to the respective link.

When checking whether any node or the network device, capable of interfering with the respective link on the first frequency channel has already been allocated a cell; it may be checked whether any node or the network device, capable of interfering with the respective link on the first frequency channel has been allocated a cell on a frequency channel which may interfere with the first frequency channel.

The above embodiment of selecting a cell for allocating to a respective link may be used to select cells for a primary schedule and/or to select cells to allocate as redundancy cells.

Before a cell is allocated to a link, a suitable cell may be selected. A suitable cell may be one that does not result in collision or interference.

Interference is caused by at least two links which are physically close enough such that wireless communication on one of the links can interfere with, and affect, wireless communication of a further link on certain frequency channels. This is a result of either the sender node, receiver node or both nodes of one link wirelessly interfering with at least one of the nodes of the further link. This can be avoided by ensuring that potentially interfering links do not operate on potentially interfering frequency channels at the same time. Links which cannot interfere with each other (e.g. they are sufficiently far apart) can operate on the same frequency channel at the same time (i.e. in the same cell). This can save bandwidth.

Collision occurs when one network node is scheduled to communicate over two different links (either as transmitter, receiver or both) simultaneously. Collision can be avoided by ensuring each network node is only scheduled to communicate over a single link at a time.

In order to select a cell for allocating to a first link, it may be checked that neither of the two nodes or the node and the network device of the first link have already been allocated a cell (on any frequency channel) during a first considered timeslot. If so, this would cause collision and so a further timeslot is considered. Once a timeslot has been found that would not cause collision, a frequency channel is considered. A check is then made as to whether any network node (including the network device) that is capable of interfering with the network nodes (or network node and the network device) associated with the first link has been allocated a cell (i.e. a cell on a frequency channel capable of interfering with the considered frequency channel). The network nodes which are capable of interfering with a first network node are known from the network topology information.

Checking whether any node or the network device capable of interfering with the respective link on the first frequency channel has already been allocated a cell, may only comprise checking whether a cell on a frequency channel capable of causing interference has been allocated to such a node or the network device.

Once a cell has been found in a timeslot that does not cause collision and on a frequency channel that does not cause interference, it is selected for the link and allocated to the link.

A redundancy cell may be assigned to a plurality of links. The order in which links are allocated redundancy cells may be determined by the minimum number of links in a routing path for the sending nodes of the respective links; wherein a routing path for a node comprises a link or series of links for transferring data from the node to the network device; and links with shorter routing paths are assigned a redundancy cell before links with longer routing paths.

The order in which links are allocated redundancy cells may be determined by the HID number of one of the nodes of the link. The links with lower HID numbers may be assigned redundancy cells first.

A network device, network node and wireless network according to an embodiment may be configured for use with the Time Slotted Channel Hopping Medium Access Control protocol. The network device may be configured for use with the IEEE 802.15.4e standard. The IETF 6TISCH standard may specify a Path Computation Element (PCE) or PCE module. The PCE may be a central management entity. The PCE may be located on the network backbone. The PCE may use a light weight application layer protocol such as CoAP (Constrained Application Protocol) to collect the required network information e.g. network topology and/or traffic information. The PCE may be for computing a centralized schedule The network device receiving the traffic information and defining the schedule may be a PCE or PCE module.

When using the IETF 6TiSCH standard, the 6Top sublayer may be used by a network node to interpret an assigned schedule and/or send packets based on the TSCH MAC.

A cell not allocated to a link either as part of a primary schedule or as a redundancy cell may be allocated as a backup cell. Backup cells may be allocated to links at random, or based on the link reliability.

According to a further embodiment is a network device for a wireless local area network, wherein the network device is operable to wirelessly communicate with a plurality of wireless network nodes over at least one frequency channel according to a schedule which allocates cells to links, wherein a cell is a timeslot on a frequency channel; and a link represents communication between two network nodes or a network node and the network device. A network device according to this embodiment may comprise: a radio operable to receive network topology and traffic information comprising the number of packets each of the network nodes plans to transmit during a scheduling period. The network device may further comprise a processor configured to define a schedule. Defining the schedule may comprise: defining a network node sequence; determining a routing path for each network node, wherein a routing path for a respective node comprises a link or series of links for transferring data from the respective node to the network device; determining the associated number of packets for each link of each routing path; and allocating each link of each routing path a timeslot on a frequency channel for each packet. The order in which the links are allocated timeslots may be determined by the network node sequence and corresponding routing paths.

A primary schedule according to the present disclosure may be defined as an independent embodiment, or in combination with any other embodiment described herein. As such, in an embodiment, a primary schedule may be part of a schedule comprising redundancy cells; whereas in a further embodiment, a primary schedule may be a stand-alone schedule.

Discussion relating to a network device configured to define a primary schedule as part of a schedule comprising redundancy cells and the corresponding discussion relating to the primary schedule itself, above, applies mutatis mutandis to this embodiment.

Defining the schedule may further comprise: selecting a cell for allocating to a respective link; Selecting a cell for a respective link may comprise checking, for a first timeslot, whether the two nodes or the node and the network device associated with the respective link have already been allocated a cell during that timeslot, when one of the two nodes or one of the node and the network device has already been allocated a cell in the first timeslot: checking, for a further timeslot, whether the two nodes or the node and the network device associated with the respective link have already been allocated a cell during that timeslot; or when neither of the two nodes or the node and the network device have been allocated a cell in the first timeslot: checking, for a first frequency channel in the first timeslot, whether any node or the network device, capable of interfering with the respective link on the first frequency channel has already been allocated a cell; and when an interfering node or network device has been allocated a cell in the first timeslot: checking, for a further frequency channel, whether any node or the network device capable of interfering with the respective link on the first frequency channel has already been allocated a slot; or when no interfering node or network device has been allocated a cell in the first timeslot: allocating the first cell on the first frequency channel to the respective link.

A network device according to any embodiment of the present disclosure may be configured to select a cell for allocating to a respective link as defined above. Such a network device may be combined with, or independent of, any other embodiment of the present disclosure.

Discussion relating to a network device configured to select a cell for allocating to a link and the corresponding discussion relating to the method itself, above, applies mutatis mutandis to this embodiment.

According to a further embodiment is a network node operable on a wireless local area network with a network device according to an embodiment disclosed herein. The network node may be operable to wirelessly communicate with a plurality of wireless network nodes over at least one frequency channel according to a schedule received from a network device as disclosed herein. The network node may comprise: a radio for transmitting and receiving packets to neighbouring network nodes or the network device; and a processor configured to check, for a scheduled cell, at least one of: whether the network node is expecting to receive a packet; or whether the network node is expecting to transmit a packet by checking a transmission queue. A scheduled cell may be a cell allocated in the schedule to a link associated with the node. The processor may be configured to power up the radio for a timeslot only when a packet is expected to be transmitted or received.

The processor of the network node may be configured to check, for a scheduled cell, whether the network node is expecting to receive a packet over the link to which the scheduled cell is allocated. The processor may be configured to keep the radio in a low-power state, or switched off, for a timeslot when no packet is expected to be transmitted or received.

The schedule may be received from a network device only once, upon initiation of the wireless network. The network node may then operate according to the schedule based on the 6TiSCH Stack.

The network node may be configured to operate with a network device according to an embodiment disclosed herein. The network node may be operable to receive and implement a schedule defined by a network device according to an embodiment.

A network node according to an embodiment may comprise a processor and a storage device. The processor may be configured to execute instructions stored on the storage device. The instructions may be method steps as described in relation to any method according to an embodiment, or any method steps for which a processor is described as being configured to undertake.

The network node may comprise a radio which may be operable to transmit and receive data to/from a network node or the network device. The radio may be operable to receive a schedule from the network device. The radio may be operable and/or configured to periodically transmit a Expected Receptions value to the network device. The radio may comprise an antenna.

Checking whether the network node is expecting to receive a packet may comprise checking a transmission queue to see if there are any packets which are waiting to be sent.

In order to minimise power consumption, rather than listening for a packet whenever the node has a scheduled cell, the node may only listen in order to receive a packet when the node is expecting to receive a packet. As such, before each cell scheduled to a link for which the node is a receiving node, the node may check whether a packet is expected. The node may check whether a packet is expected to be received over that specific link. If no packet is expected, the node will not listen during the scheduled cell.

Effectively, the node may ignore (and not activate during) a scheduled cell if it is not expecting to receive a packet.

Checking whether the network node is expecting to receive a packet may comprise checking a receiving queue. At the start of a scheduling period the receiving queue, B(i), may be defined as:

$$B(i)=B(i-1)+Er$$

where B(i−1) is the number of packets which have been carried over from a previous scheduling period for the network node and Er is the number of packets which are expected to be received by the network node during a scheduling period. The processor may be configured to update the receiving queue every time a packet is received by the network node; and a packet may be expected to be received when B(i)>0.

This might be a first MAC method for determining whether a node should power-up the radio. Discussion relating to an equivalent method for use with a network device, above, applies mutatis mutandis to the embodiment of a network node.

A processor of a network node may be further configured to transmit an end of queue transmission to a neighbouring node or the network device when all the network node's packets have been transmitted. The processor may be configured to transmit an end of queue transmission when an end of queue transmission has been received from a, or all the, other network nodes that can transmit to the network node. The processor may be configured to transmit an end of queue transmission when an end of queue transmission has been received from all of the network nodes that can transmit to the network node. These network nodes that can transmit to the network node may be sender nodes on links with which the first network node is associated.

Checking whether the network node is expecting to receive a packet may comprise checking whether an end of queue transmission has been received from a node. Checking whether the network node is expecting to receive a packet over a specific link may comprise checking whether an end of queue transmission has been received from the corresponding sender node for that link. Checking whether the network node is expecting to receive any packet during a specific scheduling period may comprise checking whether an end of queue transmission has been received from all of the neighbouring nodes which can transmit to the network node. A packet may be expected to be received when an end of queue transmission has not been received from a neighbouring node which can transmit to the network node.

This might be a second MAC method for determining whether a node should power-up the radio.

Discussion relating to end of queue transmissions and checking whether the network device is expecting to receive a packet, above, applies mutatis mutandis to the checking whether the network node is expecting to receive a packet.

The network node may be configured to transmit an end of queue transmission either as a separate data packet or an addition to an existing data packet. This transmission may notify the receiver that the network node has no further data packets to be sent to the receiver. A network node may have no further data packets to send once the transmission queue is empty.

According to a further embodiment is a wireless local area network comprising a network device and a network node wherein the network device is configured to: define a schedule. The schedule may comprise: at least one cell allocated to a link as a redundancy cell for communicating a packet when communication of the packet by the link during an earlier allocated cell fails; wherein a cell is a timeslot on a frequency channel; and a link represents communication between two network nodes or a network node and the network device. The network device may further be configured to transmit the schedule to the network node. The network node may be configured to: receive the schedule from the network device; and implement the schedule.

The network node may be configured to check, for a scheduled cell, at least one of: whether the network node is expecting to receive a packet; or whether the network node is expecting to transmit a packet by checking a transmission queue. A scheduled cell may be a cell allocated in the schedule to a link associated with the node. The network node may be configured to power up the radio for a timeslot only when a packet is expected to be transmitted or received.

A wireless network according to an embodiment may comprise at least one of a network node according to an embodiment and a network device according to an embodiment.

According to a further embodiment is a method for defining a schedule allocating cells to links for a wireless local area network comprising a network device and a plurality of wireless network nodes; wherein a cell is a timeslot on a frequency channel and a link represents communication between two network nodes or a network node and the network device. The method may comprise: defining a primary schedule for communicating all of the packets the network nodes plan to transmit during a scheduling period if no communication fails; and allocating to a link at least one cell as a redundancy cell for communicating a packet when communication of the packet by the link during the primary schedule fails.

A method according to an embodiment may comprise the steps for which a processor of a network device or a network node according to an embodiment is configured to undertake.

Discussion relating to processors of a network device or a network node according to an embodiment and the step for which they are configured to undertake applies, mutatis mutandis, to equivalent methods according to an embodiment.

Further according to an embodiment is a computer readable carrier medium carrying computer executable instructions which, when executed on a processor, cause the processor to carry out a method as disclosed herein.

Advantages of embodiments disclosed herein comprise:
  allowing multi-hop scheduling by reserving communication resources along the route for each set of end-to-end connection routing paths;
  compatibility with the IEEE 802.15.4e standard;
  low complexity;
  a traffic, collision and interference aware system;
  aggregated traffic due to relaying of traffic is taken into account;
  improved spectrum efficiency as cells may be shared with multiple links provided there is no conflict or interference;
  improved communication reliability and optimised system throughput by assigning redundancy cells to only active communication links therefore reserving communication resources in the case that communication failure events happen;
  reduces average runtime queue size of nodes during network operation;
  reduces end to end packet delay by using redundancy cell allocation method;

low energy consumption, even with redundant cells.

Turning now to the figures, which illustrate example embodiments. The network devices of the embodiments described herein are hubs. A wireless network 10 comprising a network device, which in this embodiment is a hub 12, and network node 14a-14s is shown in FIG. 1. The hub 12, network nodes 14a-14s and wireless network 10 are IEEE 802.15.4e TSCH MAC compliant. Possible lines of communication between the hub 12 and network nodes 14a-14s are connected in FIG. 1 by a line 16. Each line represents a link 16. A link is therefore direct communication between two network nodes 14 or a network node 14 and the hub 12. One of the two network nodes 14 or one of the network node 14 and the hub will act as a transmitter and transmit a data packet and the other will act as a receiver to receive the data packet. A node connected to a further node or the hub 12 by a link 16 is able to transmit and/or receive data from the further node or hub 12. In this embodiment, all the data generated by the plurality of network nodes 14a-14s is to be received by the hub 12.

Some nodes (e.g. node 14m) are not directly connected to the hub 12 by a link 16. As such, in order for a data packet to reach the hub 12 from these nodes, the data packet must be communicated via another node which is directly connected to the hub by a link 16. Each connection by means of a link 16 is called a hop. Each node 14a-14s will have a hop distance ID (HID) which is equal to the minimum number of hops it takes for a data packet to reach the hub 12 from the node (i.e. the minimum number of links 16 which must be used to transmit data from the node 14 to the hub 12)

When defining a schedule, a link of a network will be allocated a cell, or multiple cells, to communicate data such that all of the data from the network nodes is received by the hub during the superframe. A cell is a specific timeslot on a frequency channel.

The representation of a schedule herein illustrated by depicting a single superframe of a certain (and normally predetermined) amount of time, split into timeslots of (often of 10 ms) along the x axis, splitting the representation into columns. Along the y axis the different frequency channels, over which network nodes and the hub may communicate, are depicted as rows. Each timeslot on a frequency channel is a cell.

An algorithm for defining a schedule according to an embodiment may comprise checks to attempt to avoid or mitigate the effects of collision, narrow-band interference and multi-path fading. The ability of a node to switch between different frequency channels helps in this regard and thus improves communication reliability. Multiple links can be allocated to the same cell or different cells in the same time slot as long as they are neither conflict links (having the same receiver and/or transmitter) nor cause interference with each other.

When a cell is allocated to a link and the sender and receiver are to communicate during the allocated timeslot, both the sender and receiver will use formula (1) to determine which frequency should be used for the communication:

$$f = F_{map}(CH_{offset} + ASN) \% N_{ch} \quad (1)$$

Where f is the real channel frequency used during communication, $CH_{offset}$ is the channel offset in the TSCH schedule matrix as shown in FIG. 2A, Absolute Slot Number (ASN) is the total number of timeslots that elapsed since the beginning of the network, ASN=K*S+T, where K is the superframe cycle, S indicates the superframe size and T is the allocated timeslot; % is the modular division in (1), $N_{ch}$ indicates the number of available channels, and finally $F_{map}$ is a mapping function to find the channel frequency from a channel mapping table.

In an allocated cell where successful communication occurs, a transmitter sends a data packet and a receiver sends back an acknowledgement upon successful reception; This may be the case in any embodiment according to the present disclosure.

Figure 2:
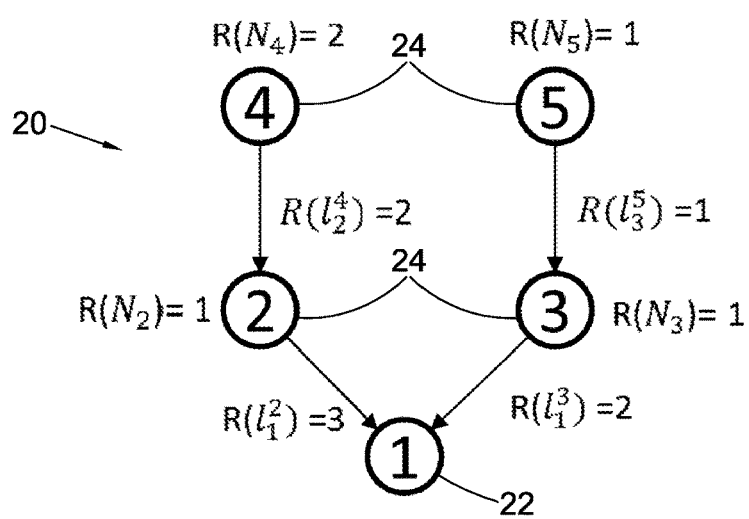
FIG. 2 schematically illustrates a further wireless network.

FIG. 2 is a schematic wireless network 20 not necessarily according to an embodiment. The wireless network 20 comprises a hub 22 (labelled "1" in FIG. 3A) and wireless network nodes 24 (labelled "2" to "5").

Each node $N_x$ has a data rate, $R(N_x)$, which is the number of packets to be transmitted to the hub 22 during a superframe. It is assumed that a data packet can be communicated during a single cell. As can be seen from the figure, the data rate for nodes 2 to 5 is 1, 1, 2 and 1 respectively. Nodes 4 and 5 are not directly connected to the hub 22. As such, their data packets must first be transferred to a node that has a HID of 1, before the data packet can be received by the hub 22. Therefore, the data packets for nodes 4 and 5 are transmitted to nodes 2 and 3 respectively, before being transmitted to the hub 22.

Each link is defined as $l_j^i$ where i represents the sender and j represents the receiver. Each link has a corresponding data rate, again defined as a number of packets per superframe, of $R(l_j^i)$. As can be seen from FIG. 2, the data rates of $l_2^4$, $l_3^5$, $l_1^2$ and $l_1^3$ are 2, 1, 3 and 2, respectively.

The links closest to the hub 22 need to relay the data packets originating from nodes 4 and 5, as well as those originating from nodes 2 and 3. The links closest to the hub 22 can only transmit the data packets originating from nodes 4 and 5 once they have been received by nodes 2 and 3. A scheduling algorithm according to an embodiment takes account of this requirement when defining a schedule.

Figures 3A, 3B, 3C, 4:
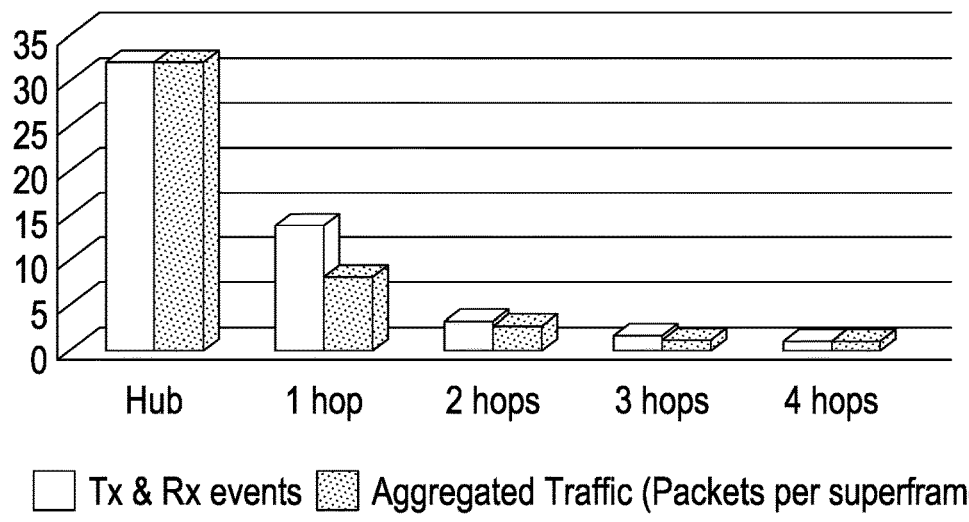
FIGS. 3A to 3C are graphical representations of three schedules for the wireless network of FIG. 2.
FIG. 4 is a graph illustrating node activity in relation to hop distance.

FIGS. 3A, 3B and 3C graphically represent three schedules for the wireless network of FIG. 2. The schedule in 3A is a good schedule because there are no wasted cells which have been allocated to links. The schedule in 3B is a bad schedule because the highlighted cells are wasted cells—no relay transmission can occur during these cells because the transmitter node in each case (e.g. node 2) has already transmitted its own data packet and has not received the data packet from its neighbouring node (node 4) to relay before the allocated cell occurs. As such, the transmitter node has no packet to send to the hub 22 during these cells. During these wasted cells, the receiver node for the link to which the cell is allocated will wake up and listen for data, but will not receive anything. This means that the energy used to wake up and listen (i.e. power up the radio) is wasted and a packet will be undelivered later in the superframe. This undelivered packet will be added to the node's queue, which will cause a delay. The schedule in 3C is another example of a bad schedule, because there is interference, whereby two link, capable of wirelessly intereferring with each others' communication are allocated to the same frequency channel at the same time, causing interference. Additionally, node 1 is scheduled to receive a packet from two different nodes (2 and 3) during the same timeslot, causing a collision.

FIG. 4 illustrates an example of the variation in the number of transmission (Tx) and Reception (Rx) events and the aggregated traffic in packets per superframe, for the hub and nodes with a HID of 1 hop, 2 hops, 3 hops and 4 hops. It can be seen that a node closer to the hub will generally have more Tx and Rx events and more aggregated traffic. This is because the closer the node is to the hub, the more traffic from nodes with higher HIDs it will need to relay. For these reasons, it may be that a link closer to the hub will be more likely to fail due to collision or interference. It may also be that links closer to the hub are viewed as having a higher priority than those with higher HIDs.

According to embodiments of the present disclosure a schedule defined for allowing data to be communicated from a plurality of nodes to a hub may comprise a cell allocated to a link for use only when communication on that link fails during an earlier time slot. Such a cell may be a redundancy cell for communicating a packet when communication of a packet by the link during an earlier allocated cell fails.

The redundancy cell or cells may only be required in the event that communication by the link during an earlier allocated cell is unsuccessful. As such, a schedule according to an embodiment may comprise a primary schedule comprising a plurality of cells allocated to links, the primary schedule being sufficient to communicate all the data from the plurality of nodes to the hub, in a superframe, in the event that no communication attempt during the primary schedule fails. A schedule may then comprise redundancy cells allotted to links, configured to communicate a packet if communication of a packet over the respective link fails during the primary schedule.

Figure 5A:
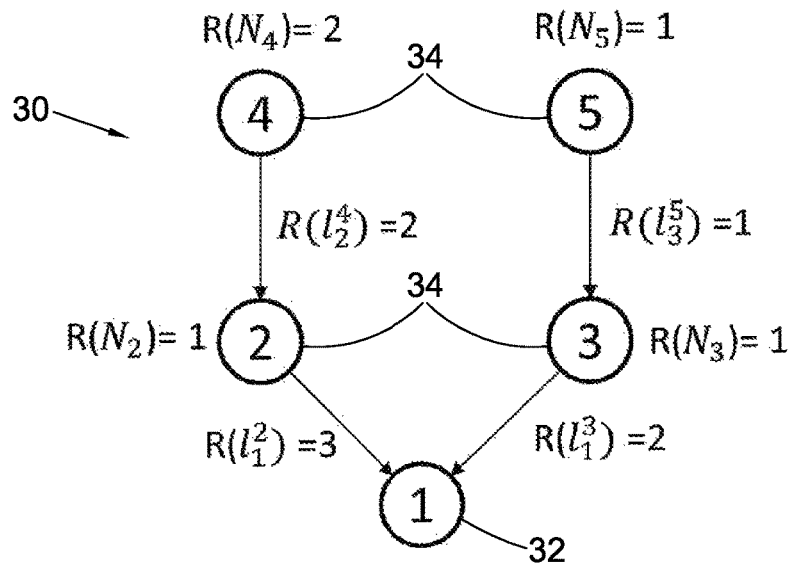
FIG. 5A schematically illustrates a wireless network according to an embodiment.

FIG. 5A schematically depicts a wireless network 30 according to an embodiment. The wireless network of FIG. 5A comprises the same arrangement of a hub 32 and plurality of nodes 34 (nodes "2" to "5"), with the same data rates, as the wireless network of FIG. 3A.

Figure 5B:
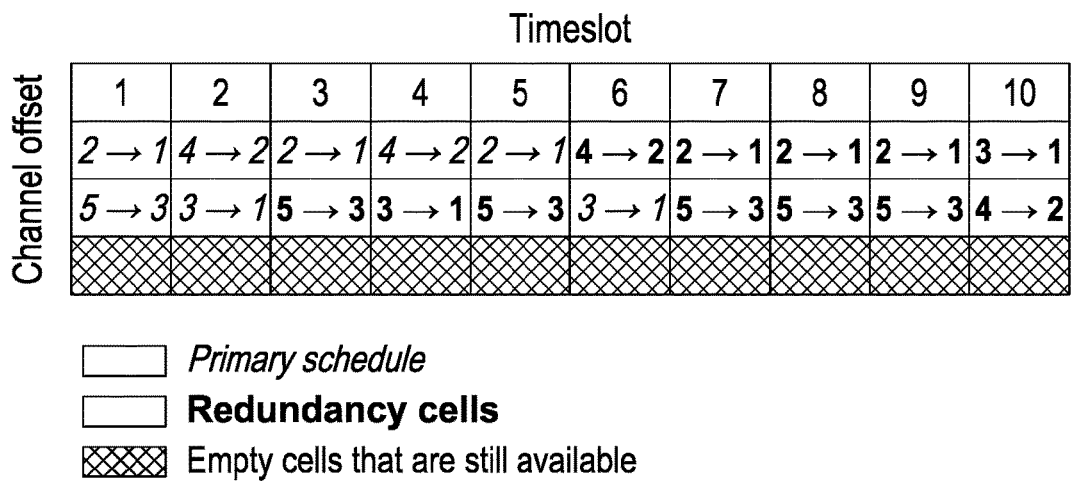
FIG. 5B is a graphical representation of a schedule defined for the wireless network of FIG. 5A.

FIG. 5B graphically represents a schedule defined by a hub or method according to the present disclosure. The superframe period of the schedule of FIG. 5B has been extended from the 6 time slots used in FIG. 3A to 3C, to 10 timeslots.

The schedule of FIG. 5B also comprises a plurality of cells allocated to links as redundancy cells, for communicating a packet when communication of a packet by the link during an earlier allocated cell fails. The schedule illustrated in FIG. 5B still has a number of empty cells that are still available.

The number of redundancy cells allocated to a specific link is calculated according to an equation. The order in which the number of redundancy cells allocated to each link is computed is based on the increased order of the HID. This means that the number of redundancy cells allocated to links connecting the 1 hop nodes to the hub is calculated first. Then the links connecting network nodes with a HID of 2, 3 etc. The number of redundancy cells, Tc, allocated to each link, $l_j^i$, of the wireless network of FIG. 5A was determined by:

$$Tc(l_j^i) = \lfloor R(l_j^i) \times \min(w_{N_i}, w_{N_j}) \rfloor \quad (2)$$

where $R(l_j^i)$ is a data rate of packets per scheduling period for link; and $w_{N_i}$, $w_{N_j}$ are weighting parameters.

For a link a weighting parameter $w_{N_i}$ is calculated for the sending node $N_i$ using (3) below, and a weighting parameter $w_{N_j}$ is calculated for the receiving node $N_j$ using (4) below. The number of redundancy cells is then calculated using (2) above.

$$w_{N_i} = \frac{T_{total} - (R_{tx}(l^{N_i}) + R_{rx}(l_{N_i}) + Tc(l^{N_i}))}{R_{tx}(l^{N_i})} \quad (3)$$

$$w_{N_j} = \frac{T_{total} - (R_{tx}(l^{N_j}) + R_{rx}(l_{N_j}) + Tc(l^{N_j}))}{R_{rx}(l^{N_i})} \quad (4)$$

In (3) and (4), $T_{total}$ is the total number of timeslots in a scheduling period (e.g. the superframe); $R_{tx}()$ and $R_{rx}()$ are the transmitted and received packets during a scheduling period respectively, for a link l involving node $N_v$ as the transmitting or receiving network node (e.g. $R_{tx}(l^{N_i})$ is the total number of packets transmitted by node $N_i$ during a scheduling period); and $Tc(l^{N_v})$ is the number of redundancy cells that are already assigned to a link with $N_v$ as the sender.

Now, using the equations above for the network of FIG. 5A:

For $l_1^2$, $N_i = N_2$; $N_j = N_1$.

$$w_{N_i} = \frac{10 - (3 + 2 + 0)}{3} = \frac{5}{3};$$

$$w_{N_j} = \frac{10 - (0 + 5 + 0)}{5} = 1$$

$$Tc(l_1^2) = \lfloor 3 \times 1 \rfloor = 3.$$

For $l_1^3$, $N_i = N_3$; $N_j = N_1$.

$$w_{N_i} = \frac{10 - (2 + 1 + 0)}{2} = \frac{7}{2};$$

$$w_{N_j} = \frac{10 - (0 + 5 + 0)}{5} = 1$$

$$Tc(l_1^3) = \lfloor 2 \times 1 \rfloor = 2$$

For $l_2^4$, $N_i = N_4$; $N_j = N_2$.

$$w_{N_i} = \frac{10 - (2 + 0 + 0)}{2} = 4;$$

$$w_{N_j} = \frac{10 - (3 + 2 + 3)}{2} = 1$$

$$Tc(l_2^4) = \lfloor 2 \times 1 \rfloor = 2$$

For $l_3^5$, $N_i = N_5$; $N_j = N_3$.

$$w_{N_i} = \frac{10 - (1 + 0 + 0)}{1} = 9;$$

$$w_{N_j} = \frac{10 - (2 + 1 + 2)}{1} = 5$$

$$Tc(l_3^5) = \lfloor 1 \times 5 \rfloor = 5$$

Thus, $Tc(l_1^2) = 3$, $Tc(l_1^3) = 2$, $Tc(l_2^4) = 2$ and $Tc(l_3^5) = 5$.

Other methods of computing the number of redundancy cells allocated to a link may be within the scope of the present disclosure. Such methods may give a fare and proportional redundancy cell allocation based on the actual traffic load scheduled on each link, while also guaranteeing that the allocated redundancy cells do not exceed the available empty cells in the superframe.

Once the number of redundancy cells for each link is determined, the cells can be allocated using any suitable method. The redundancy cells may be allocated using the method detailed below, with the traffic replaced by the number of redundancy cells to be allocated. Alternatively, the cells may be allocated using any other method, such as random or sequential allocation.

The allocation of redundancy cells, as detailed above, will in general increase the reliability and latency of a wireless network. However, the redundancy cells allocated to a link will, from the point of view of the relevant transmitter and receiver nodes, be identical to a cell allocated to the link as part of the primary schedule. As such, an unadapted node may wake up for every redundancy cell allocated to a link associated with that node, to either listen to receive a packet or attempt to transmit a packet. This may result in an increased duty cycle and high energy consumption.

Methods according to embodiments are proposed which may act to address the above. According to a first method a, or each, node has a queue, Q(i), for transmission during a superframe. The transmission queue, Q(i), follows a First In First Out rule (FIFO). As such, a wireless network node only needs to wake up to transmit a packet when Q(i)>0. When Q(i)=0 there is no packet to transmit and so a network node does not need to wake up, or activate, for a cell allocated to a link for which it is a transmitter.

Figure 6:
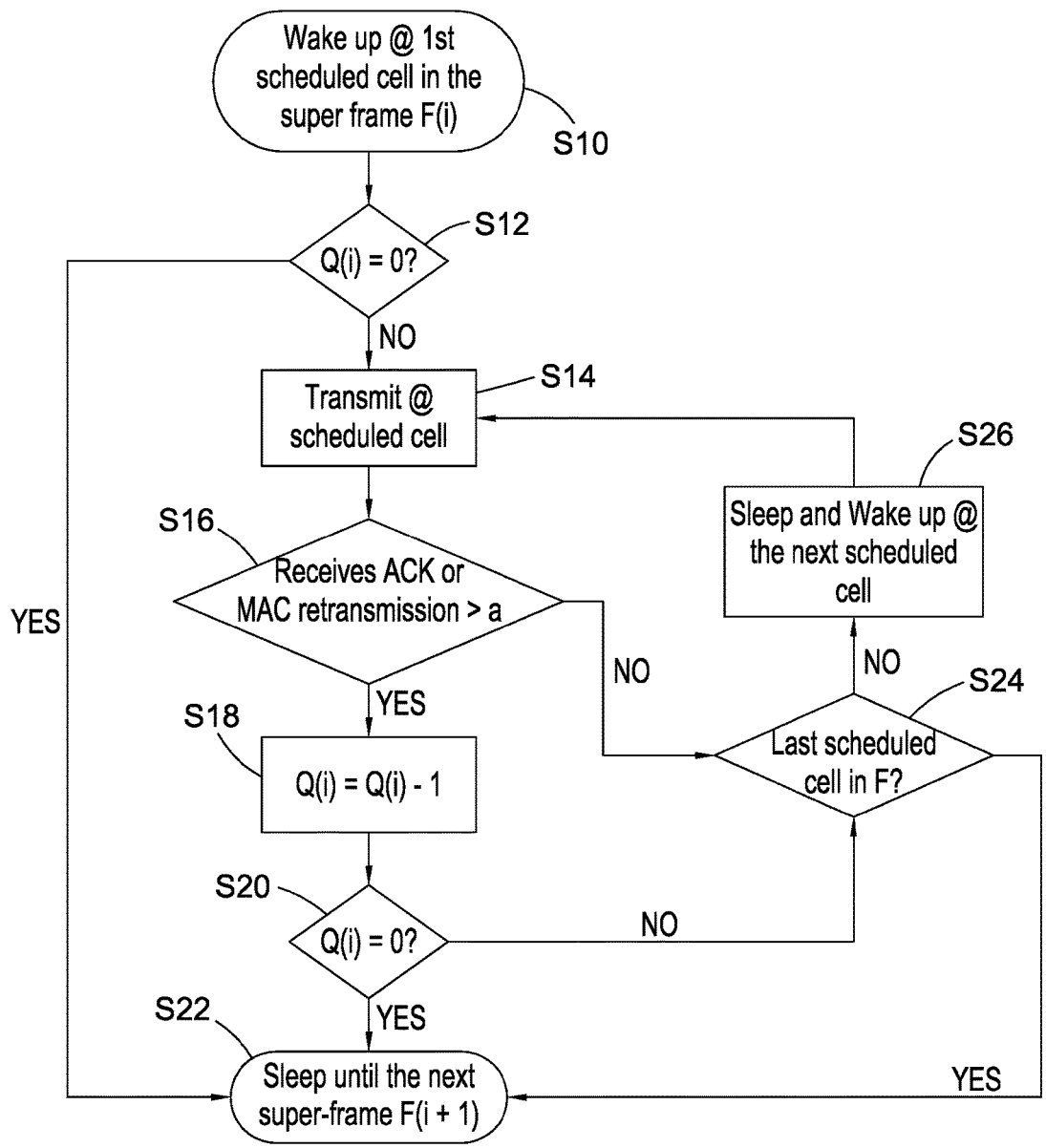
FIG. 6 is a flow chart for a method used in an embodiment for a transmitter.

FIG. 6 is a flow diagram for a network node according to an embodiment. The flow diagram illustrates a process used by a network node to determine whether it needs to wake up to transmit a packet at a scheduled cell. At the first scheduled cell in the superframe the node wakes up S10. The node, then checks if Q(i)=0, S12. If it does, the node has no packets to transmit and so can sleep until the next superframe S22. Naturally, this assumes that the node does not need to wake up to receive a packet. If Q(i)≠0, the node transmits a packet at the first scheduled, or allocated, cell S14. Once this packet has been transmitted, it is checked whether an acknowledgement transmission (ACK) has been received, or whether MAC retransmission>α, S16.

MAC retransmission>α refers to the resending of packets for which the sender does not receive an ACK message. If a packet is dropped and no ACK message is received by the sender, from the receiver, the protocol allows the sender to retransmit the packet a certain number of times, defined here as a. The packet will then be buffed in the memory. If no ACK has been received by the sender after a attempts of resending the packet, the packet is dropped by the sender If an acknowledgement transmission (ACK) has been received, or MAC retransmission >α, S16, the answer to the above is yes and Q(i)=Q(i)—1, S18. A further check of whether Q(i)=0, S20. If so, the node sleeps until the next superframe S22. If after S20, Q(i)≠0, or after S16 no ACK has been received or MAC retransmission ≯α, it is determined if the respective cell is the last scheduled cell in the current superframe S24. If it is, the node sleeps until the next superframe S22. If it is not, the node sleeps and wakes up at the next scheduled cell S26, after which it again transmits a packet at the scheduled cell S14.

According to a further method according to an embodiment a, or each, node has a queue, B (i), relating to receiving packets during a superframe. The receiving queue, B(i), indicates the number of expected packets to be received during each superframe period (i.e. a scheduling period). If during a scheduling period F(i), B(i)=0, the receiver has received all its expected packets during that superframe. The receiver node may then sleep until the next superframe.

According to an embodiment, the traffic rate is known by the hub, due to the use of centralised scheduling. Therefore, each node can check an expected receptions (Er) from MMS (as defined below) where Er is constant. Er is notified, by the hub, to the nodes along with the schedule. Er is periodically updated by the hub by periodically collecting the runtime queue size of the nodes.

Figure 7:
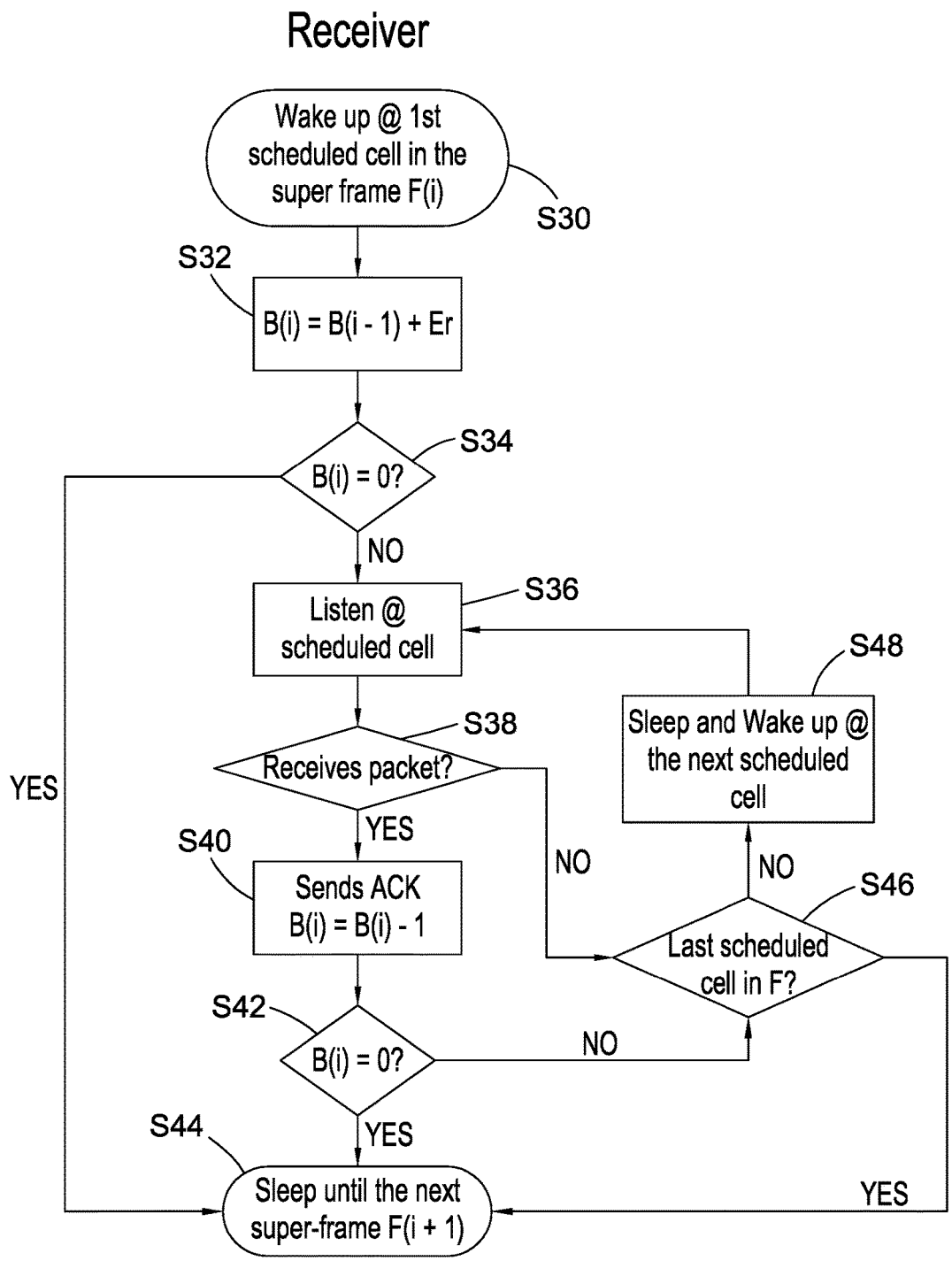
FIG. 7 is a flow chart for a method used in an embodiment for a receiver.

FIG. 7 is a flow diagram for a network node according to an embodiment. The flow diagram illustrates a process used by a network node to determine whether it needs to wake up to receive a packet at a schedule cell. At the first scheduled cell in the superframe the node wakes up S30. The node the sets B(i)=B(i−1)+Er, S32, where B(i−1) is the end value of the queue from the previous superframe. S34 is a check if B(i)=0. If this is true, the node sleeps until the next superframe S44. If this is not true, the receiver node is expected to receive something from a corresponding sender node and the receiver node listens at the next scheduled cell S36. The node may listen at the next cell allocated to a link for which the node is a receiving node. It may be the case that B(i)≠0 when scheduled cells are wasted due to packet drop or MAC retransmissions occurring in the scheduled cell. The node may wake up at every scheduled cell when B(i)≠0.

The node checks if a packet has been received S38 and, if a packet has been received, it sends an acknowledgement (ACK) and sets B(i)=B(i)−1, S40. A further check is made to see if B(i)=0 and, if it does, the node sleeps until the next superframe S44. If a packet is not received or B(i)≠0 after the second check (S42), the node checks if the current cell is the last scheduled cell in the current superframe S46. If so, the node sleeps until the next superframe S44. If not, the node sleeps and wakes up at the next scheduled cell S48, before listening for a packet S36.

In any embodiment, a more accurate estimation of B(i) could be achieved by sending nodes updating their Q(i) status with the receiving node during the periodical synchronisation process in TSCH.

According to a further embodiment, a sending node of a respective link informs the receiving node once its transmission queue, Q(i), is empty. This is done by an End-of-Q notification being added to the last message stored in the queue. Alternatively, an additional message, comprising a notification informing the receiving node that all the packets have been transmitted, may be sent in the following assigned redundancy slot. Once a node acting as a receiver for a specific link has received all such notifications from the nodes from which it may receive packets, it can go to sleep to wake up for the next scheduled period. For such an embodiment, the flow diagram of FIG. 7 could be employed, wherein the setting of B(i) is removed, and the decision steps S34 and S42 are replaced with decision steps determining whether all of the End-of-Q notifications have been received.

By using a method according to an embodiment as described above, a schedule may comprise both a primary schedule and redundancy cells and minimise the amount extra resources that are consumed due to the allocated redundancy cells.

Figure 8:
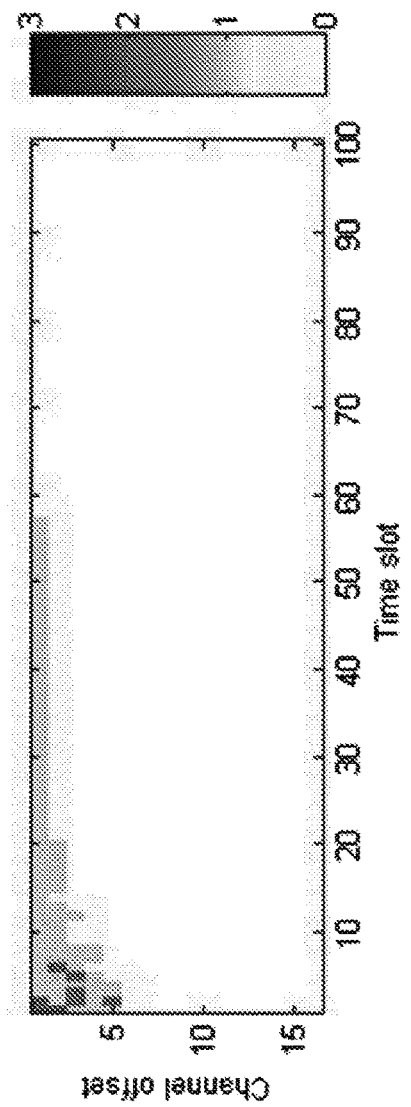
FIG. 8 is two graphs graphically illustrating throughput of two schedules, one of which has been defined according to an embodiment and one of which has not.
Figure 8:
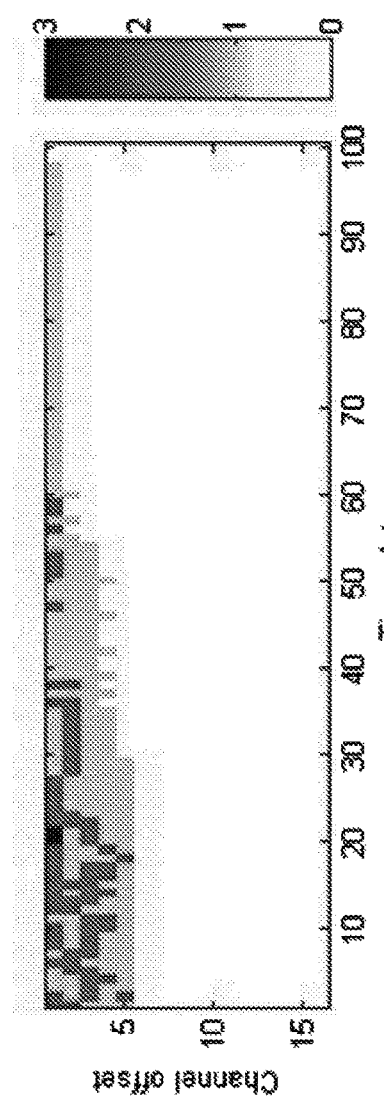

FIG. 8 illustrates the cell allocation (i.e. throughput of a schedule) based on only known traffic (a) and by adding tentative cells (b). The average traffic for the network is 3 cells per node. The shading of the cell indicates the number of concurrent links assigned to the same cell. The proposed embodiments can have a higher resource utilisation than known embodiments.

A schedule comprising redundancy cells is sent to the network nodes, by the hub for implementation.

Further according to an embodiment is a hub configured to define a schedule and a method of defining a schedule. Such a schedule may be a referred to as primary schedule as in the above embodiment.

According to an embodiment, a hub (which will be used to refer to a device configured to define a schedule) first acquires network information, wherein the network information comprises network topology and traffic information. The hub acquires this information via a radio. The network information is acquired using contention based MAC procedures at the beginning of the network operation, for example using Carrier Sense Multiple Access (CSMA) or Routing Protocol for Low-Power and Lossy Networks (RPL) protocol to discover the network topology and traffic information and send this back to the hub via signalling messages such as a Destination Advertisement Object (DAO) message as defined in RPL. The network then switches to a reservation based scheduling approach once the information has been acquired. This may be the case for any embodiment according to the present disclosure.

The network topology comprises the hop-distance ID (HID). For each node, the minimum number of hops (i.e. transmissions from one node to another node) to reach the hub is known as the HID. This information is acquired by the hub during the network initiation process, for example by the hub broadcasting a Hello message and the network nodes that receive this message are assigned with a HID; after the nodes are assigned a HID, the nodes reply with an acknowledgement message including the HID which is sent back to the hub. This is one example of a suitable method and any other suitable method is within the scope of the present disclosure.

In different routing protocols different methods may apply. For example, in the case of RPL, the nodes can use the HID to calculate the rank and use the Destination Orientated Directed Acrylic Graph Information Object (DIO) and DAO to learn the neighbouring nodes that can transmit to that node (parents) and nodes to which it can transmit (children).

The traffic information comprises the number of packets each of a plurality of nodes in the wireless network generates. A Constant Bit Rate (CBR) traffic model is used. The hub therefore knows how many packets each network node plans to transmit during each scheduling period (equal to the number of packets generated by each network node in the present embodiment). Naturally, this does not include multi-hop relay traffic, which is dependent on the schedule itself.

The network information further comprises the one-hop communication interference range. This comprises information regarding which nodes and links, when in use, interfere with each other. This information is used when scheduling to ensure interfering links are not scheduled to be active at the same time on interfering frequency channels. This information could be estimated during a network initialisation stage based on Received Signal Strength Indication (RSSI). Alternatively, a predefined model such as a two-hop interference model could be used in order to acquire interference information.

The hub further comprises a processor configured to define a schedule according to the following method. A network node sequence is defined. A 2-by-N matrix, where N is the number of network nodes generating packets, is created. The first row of the matrix represents the node ID and the second row is the corresponding node data rate (i.e. packets per scheduling period). This matrix is referred to as the Scheduling Sequence (SS) matrix. The SS matrix for the wireless network of FIG. 5A may be as follows:

$$SS = \begin{bmatrix} 4253 \\ 2111 \end{bmatrix} \begin{matrix} \text{node} \\ \text{traffic} \end{matrix}$$

The order in which the nodes are listed in the network node sequence, in the first row of the SS matrix, may affect the final schedule. In the above SS matrix, a low complexity greedy algorithm based on the node's queue size is used to determine the order, this reduces the scheduling time. Other methods may be employed to select a node order; optimisation algorithms may be used to determine the node order and the use of such algorithms is within the scope of the present disclosure. Example algorithms for determining the order may include genetic algorithms and stochastic approaches.

Figure 9:
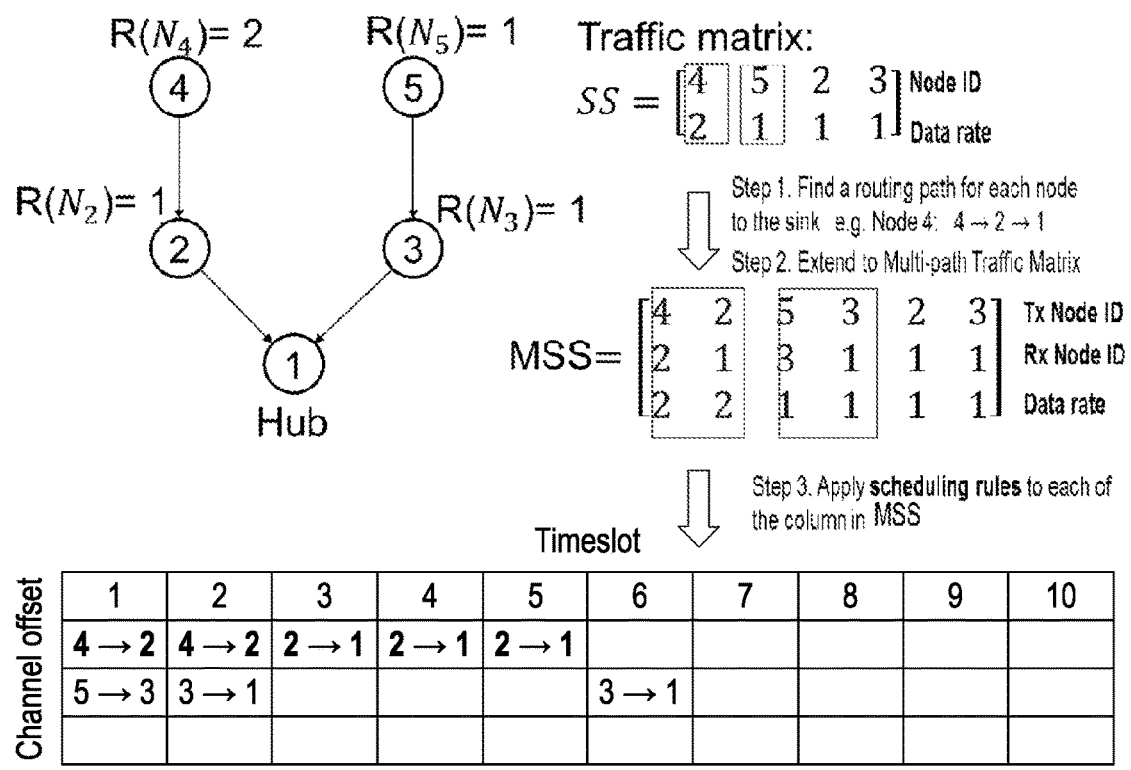
FIG. 9 illustrates an aspect of a method which may be according to an embodiment.

For each of the nodes in the SS matrix, a routing path is determined from the network node to the hub. A routing path comprises a series links which enable data to be transferred from the network node to the hub. Different routing algorithms and protocols can be used to provide an optimal route. All such methods are within the scope of the present disclosure. Example routing algorithms include shortest path based, load balancing based or link quality based (RPL). In the present embodiment, the SS matrix is now extended to include these routing paths. For each of the nodes in the SS matrix, a routing path replaces the node. The order in which the hops of the routing path are considered and entered into the matrix is based on the order in which the routing path from the node to the hub dictates; this ensures that multi-hop communications are scheduled in turn. As such, for node "4", the routing path "4→2; 2→1" is used. This occupies the first two rows of a 3-row Multihop Scheduling Sequence (MSS) matrix. The corresponding traffic for each hop of each route is listed in the third row. This is illustrated in FIG. 9.

$$SS = \begin{bmatrix} 4253 \\ 2111 \end{bmatrix} \rightarrow MSS \begin{bmatrix} 422533 \\ 211311 \\ 221111 \end{bmatrix} \begin{matrix} \text{sender} \\ \text{receiver} \\ \text{traffic} \end{matrix}$$

Now a primary schedule can be defined by allocating cells to links. In order to do so, the associated number of packets for each link of each routing path needs to be determined. In the above example, this value is represented in the third row of the MSS matrix. Note that while the wireless network of FIG. 5A is used as an example network. FIG. 5B illustrates a primary schedule and redundancy cells allocated to links. The primary schedule portion of the schedule illustrated in FIG. 5B is not necessarily a primary schedule as defined by the method of this embodiment. The schedule graphically illustrated in FIG. 3A is a primary schedule as defined by the above process.

A schedule is defined by allocating a cell to each traffic unit (data packet) over each link. The order in which the links are allocated cells is determined by the sequence determined above—that is the sequence in the MSS matrix. In the present embodiment, the link $l_2^4$ is first allocated a cell in the schedule for its first data packet. The link $l_2^4$ is then allocated a second cell for the second data packet.

In general, the cells earlier in the scheduling period are allocated to links first. In general, the cells corresponding to lower frequency channel numbers are allocated to links first. However, according to an embodiment of the present disclosure, which may be used in isolation or combination with any of the other embodiments, is a method and a hub configured to execute a method of selecting cells to be allocated to links, in light of collision and interference.

Figure 10:
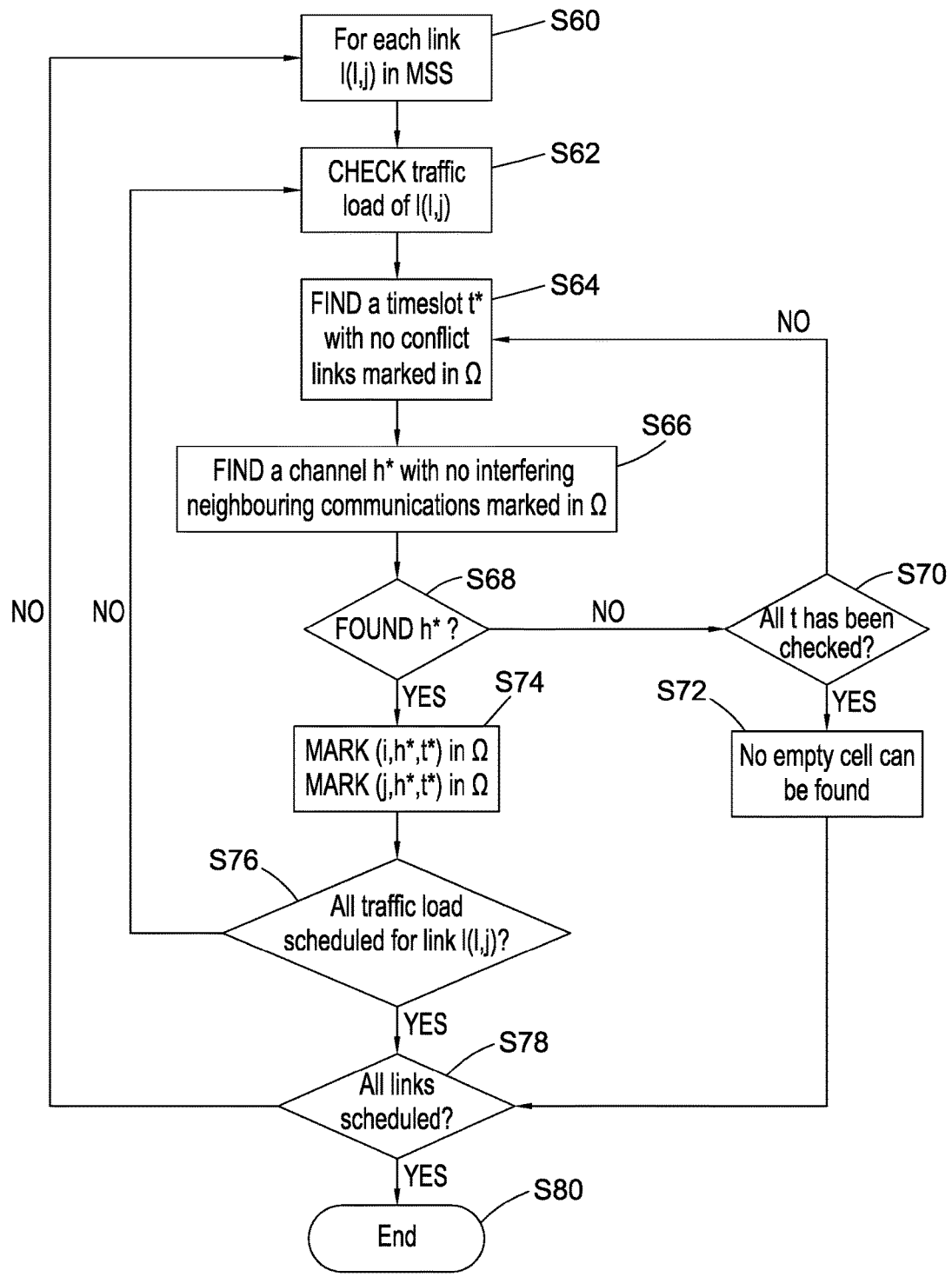
FIG. 10 is a flow chart for a method used in an embodiment.

A method of selecting cells is illustrated in the flow chart of FIG. 10, the method selects and allocates cells such that interference and collision is avoided.

A method for selecting and allocated cells can utilise a communication matrix $\Omega$ to check for collision and interference. The communication matrix $\Omega$ is an M-by-$N_{ch}$-by-S matrix, wherein M is the total number of nodes in the network, $N_{ch}$ is the number of channel offsets and S is the total number of timeslots in the scheduling period. Each time a link is to be allocated a cell, the matrix $\Omega$ is checked in order to select a cell that does not collide or interfere with already allocated cells. Once a cell has been allocated, the corresponding entries for the sender and receiver node of that link are marked in the Ω matrix.

Both the sender network node and receiver network node's neighbours need to be checked for interference (both transmitting or receiving) for any scheduled cell, as communication during a cell comprises two communications—the sender transmitting the packet and the receiver sending an acknowledgement.

FIG. 10 is a flow chart for a method of selecting cells to allocate to links using the above communication matrix Ω. This method is undertaken for each link in the MSS S60. The traffic load of the respective link is checked S62. For each data packet on each link of each routing path, a timeslot with no conflict links marked in Ω is found S64. A channel with no interfering neighbouring communications marked in Ω is checked for S66. A check is made to see if a channel is found S68. If not, a check is made to see if all the timeslots in the scheduling period have been checked S70—if not, a different timeslot with no conflict links in Ω is found S64; if so, no empty cell can be found S72 and a check is made to see if all the links are scheduled S78.

If, during check S68 a channel has been found, the Ω matrix entry for the sender node and receiver node of the respective link is marked S74. A check is then made as to whether all the traffic load for that link has had a cell selected and allocated to it. If not, step S62 is done again and the traffic load of the respective link is checked and a timeslot with no conflict link in Ω is found S64. If all the traffic load for the respective link has been scheduled, a check is made as to whether all the links have been scheduled S78. If not, the process starts again from step S60 for a further link. If so, the selection and allocation of cells for the primary schedule is complete S80.

This method can be presented in the following "pseudo-code":

```
For each link l_j^i in MSS
    For each traffic load for l_j^i in MSS
        For timeslot t = 1:S
            check Ω with sender i and receiver j at timeslot t
            If a mark is found on any channel h
                Timeslot has been taken;
                t = t +1
            else
                a timeslot t* is available
                Find sender i and receiver j's interfering neighbour set V
                For each channel h = 1:N_ch
                    check Ω with (V, h, t*)
                    If a mark is found
                        Channel h is taken;
                        h= h+1;
                    else
                        an available channel h* is found
                        break;
                    end
                end
                If h = N_ch
                    No channel available on timeslot t t*
                    t = t+1
                end
            end
        end
        mark (i, h*, t*) and (j, h*, t*) in Ω
    end
end
```

As can be seen from the above pseudo-code, the method essentially comprises iteratively checking—for each data packet of each link of each routing path—for a timeslot where no collision occurs and, once a timeslot has been found checking for a frequency channel on which there will be no interference for either of the sender or receiver node. The timeslots and frequency channels are checked, starting from the earliest, iteratively with the timeslot and channel increasing by one every time collision or interference occurs.

Once a primary schedule has been defined, in accordance with any embodiment, the primary schedule is sent, by the hub, to the network nodes for implementation.

If the network topology changes (e.g. node failure or route changes), uplink messages, e.g. DAO messages can be used to notify the hub to perform a rescheduling for the entire network or affected links using a method according to an embodiment.

Figure 11:
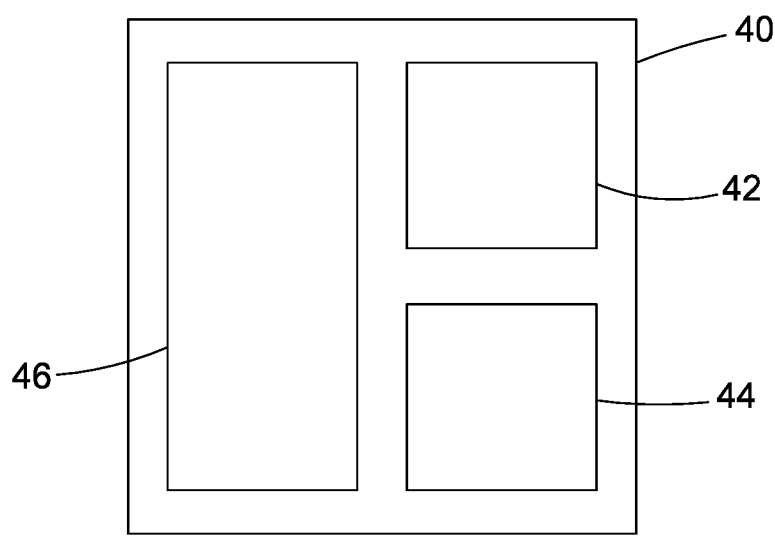
FIG. 11 schematically illustrates a hub according to an embodiment.

FIG. 11 schematically illustrates a network device 40 according to an embodiment. The network device 40 of FIG. 40 may be for use in the wireless network of FIG. 5A. The network device 40 of FIG. 10 comprises a radio 42 for receiving traffic information and a processor 44 configured to define a schedule. The network device 40 also comprises a storage device 46 for storing instructions.

Figure 12:
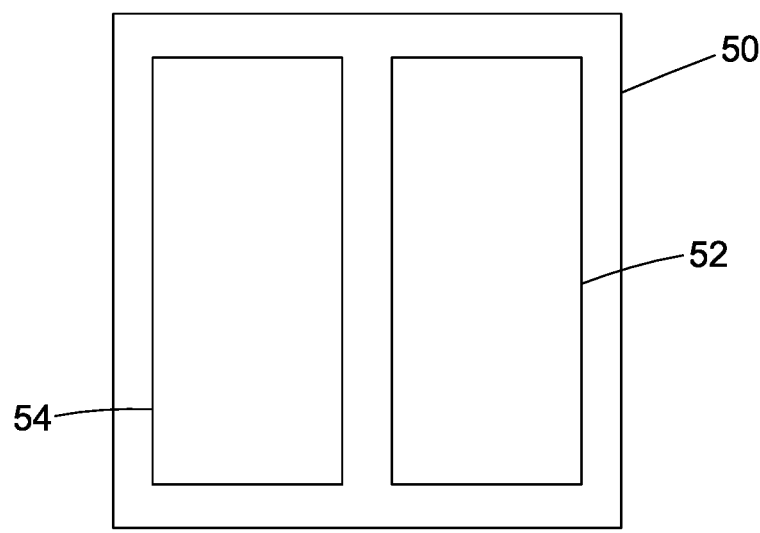
FIG. 12 schematically illustrates a node according to an embodiment.

FIG. 12 illustrates a network node 50 according to an embodiment. The network node 50 comprises a radio 52 for transmitting packets to and receiving packets from a neighbouring network node or a network device (e.g. a hub). The radio 52 may also be for receiving a schedule from a network device (e.g. a hub). The network node 50 also comprises a processor 54. Network nodes according to further embodiments may also comprise a storage device.

Figure 13:
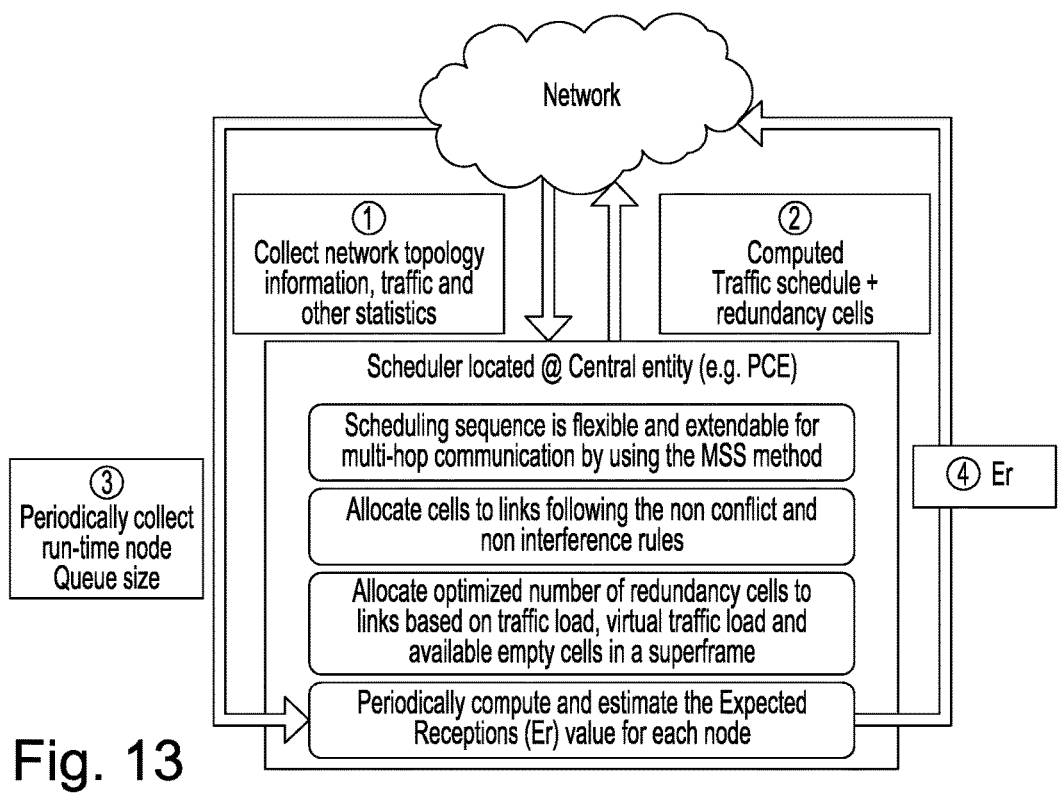
FIG. 13 schematically illustrates the operation of an embodiment.

FIG. 13 schematically illustrates a centralised Adaptive Multi-hop Scheduling (AMUS) algorithm which may comprise a hub according to an embodiment. The AMUS method of FIG. 13 collects network information, defines a primary schedule and allocates redundancy cells, periodically collects run-time Queue size and estimates Expected Receptions, which is then broadcast.

Figure 14:
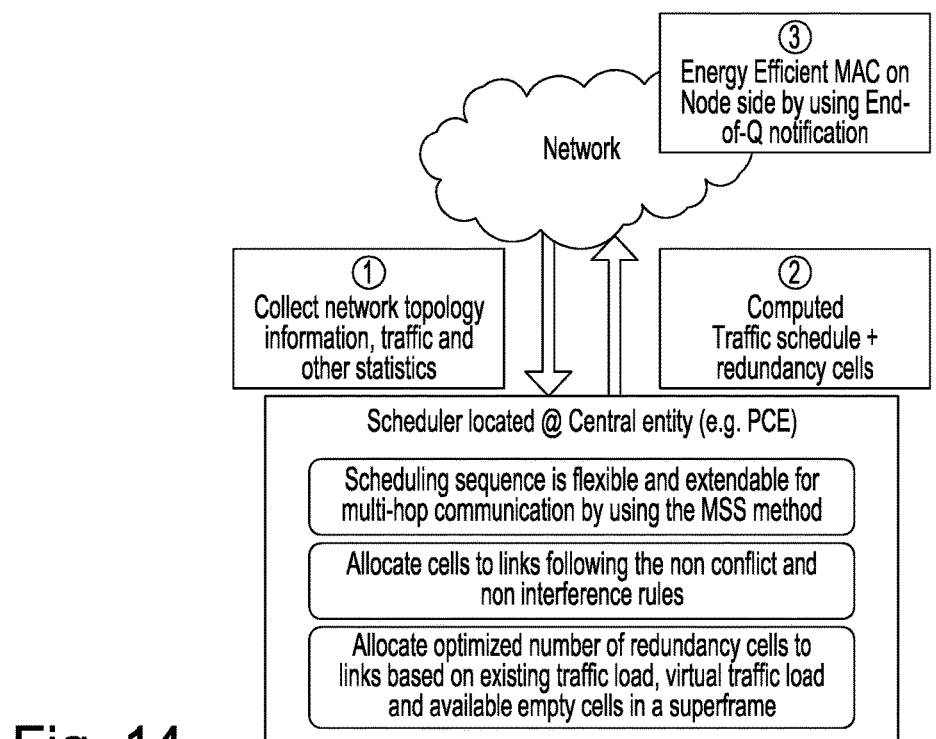
FIG. 14 schematically illustrates the operation of an alternative embodiment.

FIG. 14 schematically illustrates a centralised Adaptive Multi-hop Scheduling (AMUS) algorithm which may be executed by a hub according to an embodiment, as discussed above. The AMUS method of FIG. 14 collects network information, defines a primary schedule and allocates redundancy cells. The AMUS of FIG. 14 utilises a second MAC method for monitoring whether a node should power-up its radio for a scheduled cell. This method relies on end of queue ("End-of-Q") notifications being sent by nodes once they have no further packets to send during a scheduling period.

A network device according to an embodiment using a method according to an embodiment (referred to as AMUS and AMUS(CAP)) along with a traffic aware scheduling algorithm (TASA) (Palattella, M. R.; Accettura, N.; Dohler, M.; Grieco, L. A.; Boggia, G., "*Traffic Aware Scheduling Algorithm for reliable low-power multi-hop IEEE 802.15.4e networks*," Personal Indoor and Mobile Radio Communications (PIMRC), 2012 IEEE 23rd International Symposium on, vol., no., pp. 327, 332, 9-12 Sep. 2012) and a conventional greedy scheduling algorithm without using channel hopping technology were evaluated through simulation.

Figure 15A:
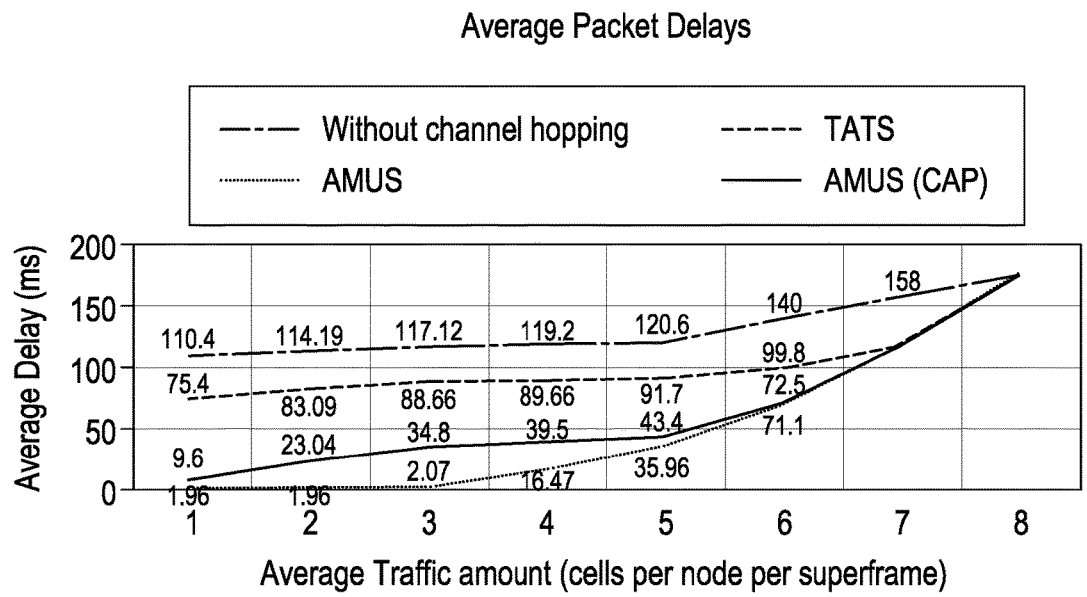
FIG. 15A is a graph showing performance of an embodiment in terms of average delay per superframe.
Figure 15B:
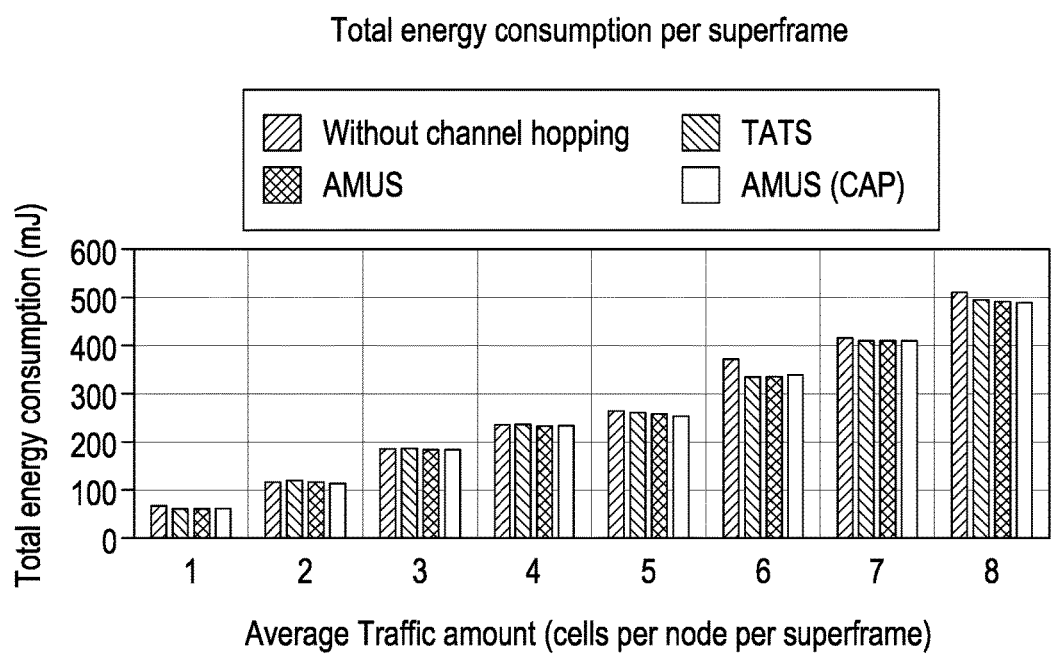
FIG. 15B is a graph showing performance of an embodiment in terms of energy consumption.

FIG. 15A shows the AMUS's performance in terms of average delay per superframe. This is computed as the time elapsed from the moment when a superframe k ends, to the moment all the packets scheduled in k have been delivered. For example, in a perfect channel condition without any packet drops, all the scheduled packets should be delivered within a superframe duration resulting in a 0 delay. Otherwise, it incurs delays. It can be observed that AMUS algorithm can reduce delays, especially in a low data rate setup. However, its performance margin decreases when the data rate increases. This stems from the reason that superframe cells have already been filled up due to high data rate, hence having less empty cells available for redundancy cell allocation. FIG. 15B is a graph showing performance of an embodiment in terms of energy consumption.

Figures 16, 17:
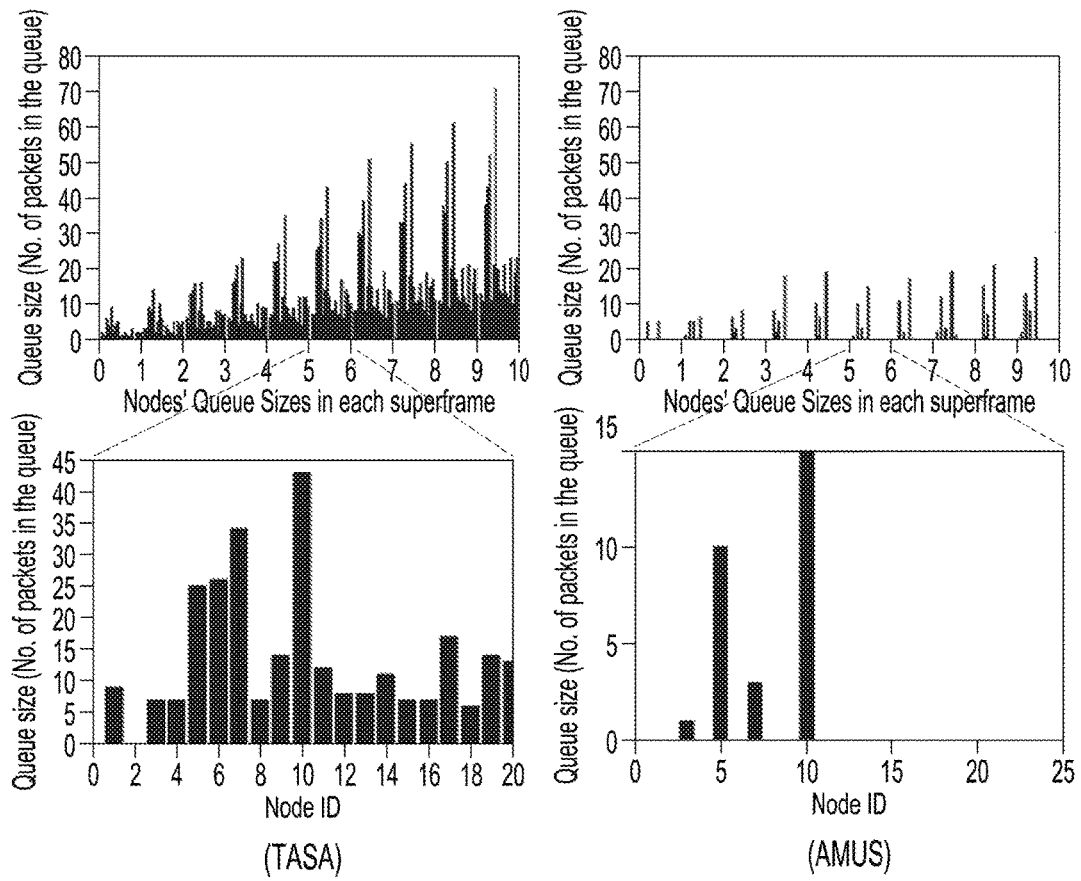
FIG. 16 is a table illustrating different superframe lengths during a simulation of an embodiment based on different average traffic amount in the network.
FIG. 17 is a graph illustrating the runtime queue size of the nodes in a network.

Since the length of the superframe is not easy to adjust once configured before the network start to operate, AMUS is adaptive to different traffic conditions. Furthermore, in the case of low network traffic, having a long superframe length will give AMUS more opportunities to allocated tentative cells. Hence, experiments have been conducted on the condition that the superframe length is set equal to the minimum schedule length required by the network traffic. FIG. 16 shows different superframe length setting for AMUS (CAP) based on different average traffic amount in the network. It can be observed that when the average node traffic rate is higher than 6 packets per superframe, the minimum schedule length is higher than the default simulation setting as 100 timeslots, therefore AMUS=AMUS (CAP). On the other hand, as node generates less traffic, the minimum schedule length is less than the default setting. Nonetheless, from FIG. 15A it is observable that AMUS (CAP) only has a slight performance degradation compared with AMUS.

FIG. 17 illustrates the runtime queue size of the nodes in the network. It can be noticed that the embodiments have a small queue size. This is because in AMUS, failed communication in a superframe can simply retransmit its packets during the redundancy cells assigned for the same link in later timeslots of the same superframe, or in the next superframe if there is none. Hence, packets are less likely to be queued.

Figure 18:
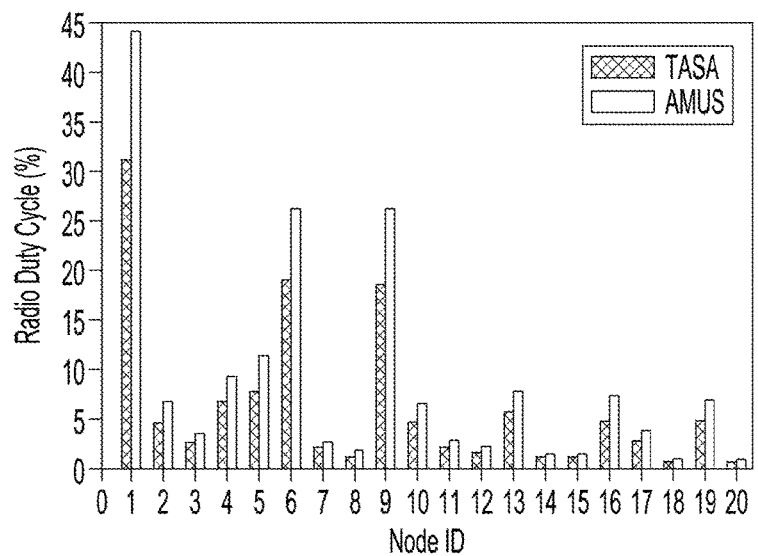
FIG. 18 is a graph illustrating the radio duty cycle of a node in a network according to an embodiment.

By introducing the tentative cells, nodes may have to wake up more times in a superframe in order to listen or transmit resulting in a high Radio duty cycle as shown in FIG. 18. However, by using the above proposed protocol, a node may wake up only in the condition that it has something to send or it expect to receive packets from others. Therefore, it avoids wasting energy if there is no real data to be sent/received. The total energy consumed per superframe is not greatly increased due to this. This is helped by the fact that the network may not need to operate as long to deliver queued messages.

Figure 19:
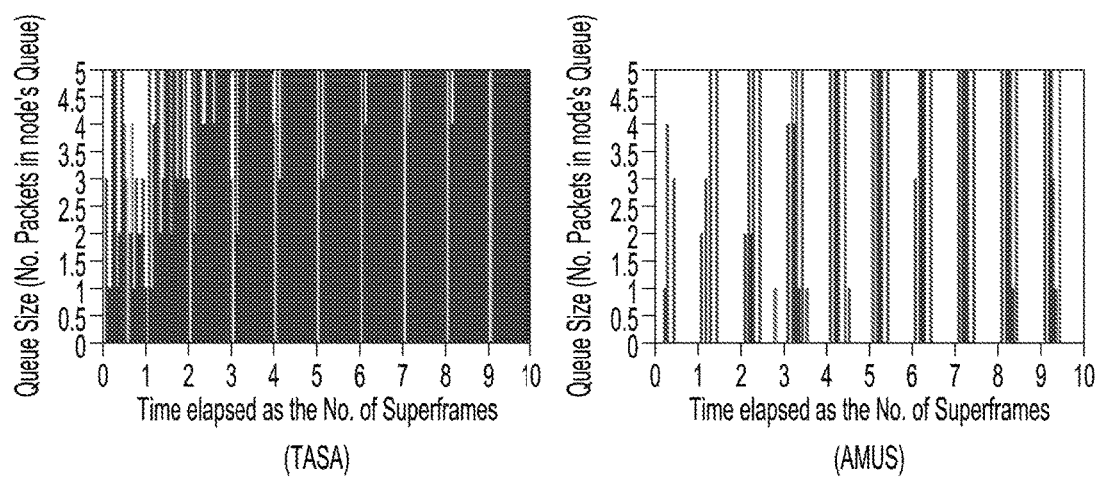
FIG. 19 is a graph of the runtime node queue with node buffer size limits of 5 packets.

Finally, some nodes may have limited memory to buffer the packets that need to be retransmitted. Another set of experiments have been conducted with each node having limited buffer size, which is set to 5 packets. This means, any node in the network can only store maximum 5 packets in the queue. Packets will be dropped if the buffer overflows. FIG. 19 shows the runtime node queue with node buffer size limits to 5 packets. The AMUS method has a low queue in the memory.

Figure 20:
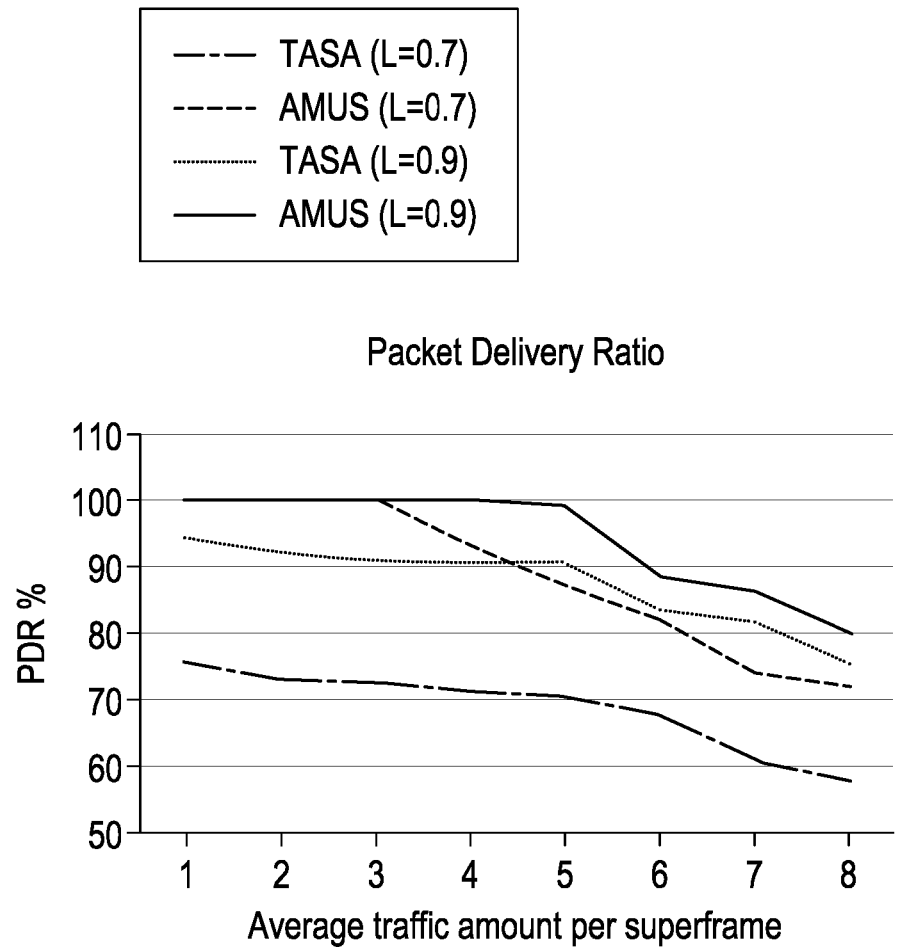
FIG. 20 is a graph showing the packet delivery ratio based on different average link quality settings.

FIG. 20 is a graph showing the packet delivery ratio based on different average link quality settings. For example, L=0.7 means the statistic average of the network link quality is 70% (the probability for a successful packet transmission). Although individual link's packet successful delivery ratio over different channels vary in the simulation. From FIG. 20, it can be observed that AMUS can provide a good packet delivery ratio in a poor link condition setting and in a good link quality setting. While in LLNs, network is more likely to have lossy links, hence embodiments can significantly improve the communication reliability.

While certain embodiments have been described, these embodiments have been presented by way of example only, and are not intended to limit the scope of the inventions. Indeed the novel methods, devices and apparatuses described herein may be embodied in a variety of other forms; furthermore, various omissions, substitutions and changes in the form of methods and apparatuses described herein may be made without departing from the spirit of the inventions. The accompanying claims and their equivalents are intended to cover such forms or modifications as would fall within the scope and spirit of the inventions.

The invention claimed is:

1. A network device for a wireless local area network, wherein the network device is operable to wirelessly communicate with a plurality of wireless network nodes over at least one frequency channel according to a schedule which allocates cells to links;
   wherein a cell is a timeslot on a frequency channel; and
   a link represents communication between two network nodes or a network node and the network device;
   the network device comprising:
   a radio operable to receive traffic information comprising the number of packets each of the network nodes is planning to transmit during a scheduling period; and
   a processor configured to define a schedule; wherein the schedule comprises a number of cells allocated to a link as redundancy cells for communicating a packet when a communication of the packet fails, the communication being performed by the link during an earlier allocated cell, wherein:
   the number of cells allocated to the link as redundancy cells is dependent on a number of packets communicated during a scheduling period by the link and is at least one.

2. A network device according to claim 1, wherein the processor is further configured to send the schedule via the radio to a network node.

3. A network device according to claim 1, wherein the number of redundancy cells allocated to a link is dependent on a weighting value, the weighting value being dependent on at least one of the total number of timeslots in the scheduling period and traffic information for the link's nodes or node and the network device.

4. A network device according to claim 1, wherein the number of redundancy cells Tc that are assigned to a link, $l_j^i$, between a sending network node, i, and a receiving network node, j, is determined by:

$$Tc(l_j^i) = \lfloor R(l_j^i) \times \min(w_{N_i}, w_{N_j}) \rfloor$$

where $R(l_j^i)$ is a data rate of packets per scheduling period for link $l_j^i$; and:

$$w_{N_i} = \frac{T_{total} - (R_{tx}(l^{N_i}) + R_{rx}(l_{N_i}) + Tc(l^{N_i}))}{R_{tx}(l^{N_i})}$$

$$w_{N_j} = \frac{T_{total} - (R_{tx}(l^{N_j}) + R_{rx}(l_{N_j}) + Tc(l^{N_j}))}{R_{rx}(l^{N_i})}$$

where $T_{total}$ is the total number of timeslots in a scheduling period; $R_{tx}(\ )$ and $R_{rx}(\ )$ are the transmitted and received packets during a scheduling period respectively, for a link l involving node $N_v$ as the transmitting or receiving network node; and $Tc(l^{N_v})$ is the number of redundancy cells that are already assigned to a link with $N_v$ as the sender;
   wherein a routing path for a respective node comprises a link or series of links for transferring data from the respective node to the network device.

5. A network device according to claim 1, wherein the radio is further operable to receive network topology and the schedule further comprises a primary schedule for communicating all of the packets the network nodes plan to transmit during a scheduling period if no communication fails; wherein defining the primary schedule comprises:
  defining a network node sequence;
  determining a routing path for each network node;
    wherein a routing path for a respective node comprises a link or series of links for transferring data from the respective node to the network device;
  determining the number of packets to be communicated by each link of each respective routing path; and
  allocating each link of each respective routing path a cell for each packet;
    wherein the order in which the links are allocated cells is determined by the network node sequence and corresponding routing paths.

6. A network device according to claim 1, wherein defining the schedule further comprises:
  selecting a cell for allocating to a respective link;
  wherein selecting a cell for a respective link comprises checking, for a first timeslot, whether the two nodes or the node and the network device associated with the respective link have already been allocated a cell during that timeslot; and
  when one of the two nodes or one of the node and the network device has already been allocated a cell in the first timeslot: checking, for a further timeslot, whether the two nodes or the node and the network device associated with the respective link have already been allocated a cell during that timeslot; or
  when neither of the two nodes or the node and the network device have been allocated a cell in the first timeslot: checking, for a first frequency channel in the first timeslot, whether any node or the network device capable of interfering with the respective link on the first frequency channel has already been allocated a cell; and
  when an interfering node or network device has been allocated a cell in the first timeslot: checking, for a further frequency channel, whether any node or the network device capable of interfering with the respective link on the first frequency channel has been allocated a cell in the first timeslot; or
  when no interfering node or network device has been allocated a cell in the first timeslot: allocating the first cell on the first frequency channel to the respective link.

7. A network device according to claim 1, wherein a redundancy cell is assigned to a plurality of links and the order in which links are allocated redundancy cells is determined by the minimum number of links in a routing path for the sending nodes of the respective links;
  wherein a routing path for a node comprises a link or series of links for transferring data from the node to the network device; and
  links with shorter routing paths are assigned a redundancy cell before links with longer routing paths.

8. A network device according to claim 1 configured for use with TSCH MAC and IEEE 802.15.4e Networks.

9. A network node operable on a wireless local area network with a network device according to claim 1, wherein the network node is operable to wirelessly communicate with a plurality of wireless network nodes over at least one frequency channel according to a schedule received from a network device according to claim 1; the network node comprising:
  a radio for transmitting and receiving packets to neighbouring network nodes or the network device; and
  a processor configured to check, for a scheduled cell, at least one of:
    whether the network node is expecting to receive a packet; or
    whether the network node is expecting to transmit a packet by checking a transmission queue;
      wherein a scheduled cell is a cell allocated in the schedule to a link associated with the node; wherein
  the processor is configured to power up the radio for a timeslot only when a packet is expected to be transmitted or received.

10. A network node according to claim 9, wherein checking whether the network node is expecting to receive a packet comprises checking a receiving queue, the receiving queue, B(i), at the start of a scheduling period being defined as:

$$B(i)=B(i-1)+Er$$

where $B(i-1)$ is the number of packets which have been carried over from a previous scheduling period for the network node and $Er$ is the number of packets which are expected to be received by the network node during a scheduling period;
wherein the processor is configured to update the receiving queue every time a packet is received by the network node;
and a packet is expected to be received when $B(i)>0$.

11. A network node according to claim 9, wherein the processor is further configured to transmit an end of queue transmission to a neighbouring node or the network device when all the network node's packets have been transmitted and an end of queue transmission has been received from all the other network nodes that can transmit to the network node; and
  checking whether the network node is expecting to receive a packet comprises checking whether an end of queue transmission has been received from all of the neighbouring nodes which can transmit to the network node;
  wherein a packet is expected to be received when an end of queue transmission has not been received from a neighbouring node which can transmit to the network node.

12. A wireless local area network comprising a network device and a network node wherein
  the network device is configured to:
    define a schedule, the schedule comprising:
    a number of cells allocated to a link as redundancy cells for communicating a packet when a communication of the packet fails, the communication being performed by the link during an earlier allocated cell; wherein
    the number of cells allocated to the link as redundancy cells is dependent on a number of packets communicated during a scheduling period by the link and is at least one:
    a cell is a timeslot on a frequency channel; and the link represents communication between two network nodes or a network node and the network device; and
    transmit the schedule to the network node; and
  the network node is configured to:
    receive the schedule from the network device; and
    implement the schedule.

13. A method for defining a schedule allocating cells to links for a wireless local area network comprising a network device and a plurality of wireless network nodes;
- wherein a cell is a timeslot on a frequency channel and a link represents communication between two network nodes or a network node and the network device;
- the method comprising:
  - defining a primary schedule for communicating all of the packets the network nodes plan to transmit during a scheduling period if no communication fails; and
  - allocating to a link a number of cells as redundancy cells for communicating a packet when a communication of the packet fails, the communication being performed by the link during the primary schedule and, wherein:
  - the number of cells allocated to the link as redundancy cells is dependent on a number of packets communicated during a scheduling period by the link and is at least one.

14. A non-transitory computer readable carrier storage medium carrying computer executable instructions which, when executed on a processor, cause the processor to carry out a method according to claim 13.

* * * * *